(12) United States Patent
Kim et al.

(10) Patent No.: US 9,262,063 B2
(45) Date of Patent: Feb. 16, 2016

(54) TOUCH-SCREEN USER INTERFACE

(75) Inventors: John T. Kim, La Canada, CA (US); Christopher Green, San Francisco, CA (US); Joseph J. Hebenstreit, San Francisco, CA (US); Kevin E. Keller, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 1627 days.

(21) Appl. No.: 12/553,080

(22) Filed: Sep. 2, 2009

(65) Prior Publication Data
US 2011/0050594 A1    Mar. 3, 2011

(51) Int. Cl.
*G06F 3/041* (2006.01)
*G06F 3/0484* (2013.01)
*G06F 3/0488* (2013.01)
*G10L 13/033* (2013.01)

(52) U.S. Cl.
CPC .......... *G06F 3/04847* (2013.01); *G06F 3/0488* (2013.01); *G10L 13/033* (2013.01)

(58) Field of Classification Search
None
See application file for complete search history.

(56) References Cited

U.S. PATENT DOCUMENTS

| | | | |
|---|---|---|---|
| 2,414,653 A | 1/1947 | Lookholder | |
| D226,196 S | 1/1973 | Liljenwall | |
| 4,287,676 A | 9/1981 | Weinhaus | |
| 4,319,097 A | 3/1982 | Liautaud | |
| D274,798 S | 7/1984 | O'Hara et al. | |
| 4,789,301 A | 12/1988 | Osborne et al. | |
| 4,815,683 A | 3/1989 | Ferrante | |
| 5,045,637 A | 9/1991 | Sato et al. | |
| 5,097,388 A | 3/1992 | Buist et al. | |
| D325,571 S | 4/1992 | Sakaguchi et al. | |
| 5,189,698 A | 2/1993 | Hakanen | |
| 5,301,224 A | 4/1994 | Major | |

(Continued)

FOREIGN PATENT DOCUMENTS

| KR | 300249751 | 10/1999 |
|---|---|---|
| KR | 30-2004-0025424 | 8/2004 |
| WO | WO9120072 A1 | 12/1991 |

OTHER PUBLICATIONS

Utility U.S. Appl. No. 11/277,879, filed Mar. 29, 2006, entitled "Keyboard Layout for Handheld Electronic Book Reader Device," Gregg Elliott Zehr, Thomas J. Hobbs, John E. Johnston, Symon J. Whitehorn.

(Continued)

*Primary Examiner* — Joseph Haley
(74) *Attorney, Agent, or Firm* — Lee & Hayes, PLLC

(57) ABSTRACT

A user interface for a touch-screen display of a dedicated handheld electronic book reader device is described. The user interface detects human gestures manifest as pressure being applied by a finger or stylus to regions on the touch-screen display. In one implementation, the touch-screen user interface enables a user to turn one or more pages in response to applying a force or pressure to the touch-screen display. In another implementation, the touch-screen user interface is configured to bookmark a page temporarily by applying a pressure to the display, then allowing a user to turn pages to a new page, but reverting back to a previously-displayed page when the pressure is removed. In another implementation, the touch-screen user interface identifies and filters electronic books based on book size and/or a time available to read a book. In another implementation, the touch-screen user interface converts text to speech in response to a user touching the touch-screen display.

22 Claims, 19 Drawing Sheets

(56) References Cited

U.S. PATENT DOCUMENTS

| | | |
|---|---|---|
| 5,417,575 A | 5/1995 | McTaggart |
| D359,753 S | 6/1995 | Salinas et al. |
| 5,460,414 A | 10/1995 | Sargis |
| 5,477,510 A | 12/1995 | Ukita |
| D366,067 S | 1/1996 | Mowrey |
| 5,487,616 A | 1/1996 | Ichbiah |
| D370,235 S | 5/1996 | Wood |
| 5,534,888 A | 7/1996 | Lebby et al. |
| 5,550,754 A | 8/1996 | McNelley et al. |
| 5,566,098 A | 10/1996 | Lucente et al. |
| D375,515 S | 11/1996 | Takeda et al. |
| D377,930 S | 2/1997 | Sekino et al. |
| 5,609,488 A | 3/1997 | McTaggart |
| 5,660,488 A | 8/1997 | Miller |
| 5,661,635 A | 8/1997 | Huffman et al. |
| 5,663,748 A | 9/1997 | Huffman et al. |
| 5,696,982 A | 12/1997 | Tanigawa et al. |
| D390,211 S | 2/1998 | Yates et al. |
| 5,761,485 A | 6/1998 | Munyan |
| 5,825,617 A | 10/1998 | Kochis et al. |
| 5,847,698 A | 12/1998 | Reavey et al. |
| 5,850,998 A | 12/1998 | Parsey et al. |
| 5,914,707 A | 6/1999 | Kono |
| 5,944,574 A | 8/1999 | Small et al. |
| 5,956,021 A | 9/1999 | Kubota et al. |
| 5,971,636 A | 10/1999 | Mensick |
| 5,991,594 A | 11/1999 | Froeber et al. |
| 6,021,306 A | 2/2000 | McTaggart |
| D421,744 S | 3/2000 | Ono |
| 6,037,954 A | 3/2000 | McMahon |
| 6,049,450 A | 4/2000 | Cho et al. |
| 6,061,050 A | 5/2000 | Allport et al. |
| 6,068,194 A | 5/2000 | Mazur |
| D426,547 S | 6/2000 | Khovaylo et al. |
| 6,107,988 A | 8/2000 | Phillipps |
| 6,111,527 A | 8/2000 | Susel |
| 6,133,580 A | 10/2000 | Sun |
| D433,460 S | 11/2000 | Griffin et al. |
| D437,002 S | 1/2001 | Wudtke et al. |
| 6,181,344 B1 | 1/2001 | Tarpenning et al. |
| 6,219,227 B1 | 4/2001 | Trane |
| 6,233,141 B1 | 5/2001 | Lee et al. |
| D443,613 S | 6/2001 | Do et al. |
| D444,466 S | 7/2001 | Nishida |
| D449,606 S | 10/2001 | Lee et al. |
| 6,297,945 B1 | 10/2001 | Yamamoto |
| 6,313,828 B1 | 11/2001 | Chombo |
| 6,320,591 B1 | 11/2001 | Griencewic |
| D454,870 S | 3/2002 | Lee et al. |
| 6,398,178 B1 | 6/2002 | Azola et al. |
| D460,493 S | 7/2002 | Griffin et al. |
| 6,473,058 B1 | 10/2002 | Hotomi et al. |
| 6,473,069 B1 | 10/2002 | Gerpheide |
| D466,115 S | 11/2002 | Hawkins et al. |
| 6,529,185 B1 | 3/2003 | Armstrong |
| 6,529,218 B2 | 3/2003 | Ogawa et al. |
| D481,036 S | 10/2003 | Wentt |
| 6,632,094 B1 | 10/2003 | Falcon et al. |
| D482,359 S | 11/2003 | Skillman et al. |
| 6,642,909 B1 | 11/2003 | Oliva |
| D490,119 S | 5/2004 | Griffin et al. |
| D490,422 S | 5/2004 | Iwama et al. |
| D492,304 S | 6/2004 | Nishida |
| 6,757,551 B2 | 6/2004 | Newman et al. |
| 6,766,332 B2 | 7/2004 | Miyazaki et al. |
| D496,654 S | 9/2004 | Burroughs |
| 6,798,649 B1 | 9/2004 | Olodort et al. |
| D499,095 S | 11/2004 | Balarezo |
| 6,867,763 B2 | 3/2005 | Griffin et al. |
| 6,876,354 B1 | 4/2005 | Terasaki et al. |
| 6,882,326 B2 | 4/2005 | Hirayama et al. |
| 6,886,036 B1 | 4/2005 | Santamaki et al. |
| 6,894,893 B2 | 5/2005 | Hidesawa |
| 6,933,928 B1 | 8/2005 | Lilienthal |
| 6,937,464 B2 | 8/2005 | Adams et al. |
| 6,941,160 B2 | 9/2005 | Otsuka et al. |
| D511,162 S | 11/2005 | Majumder |
| 6,970,866 B1 | 11/2005 | Pravetz et al. |
| 7,009,596 B2 | 3/2006 | Seet et al. |
| D524,308 S | 7/2006 | Lai |
| 7,098,896 B2 * | 8/2006 | Kushler et al. ................. 345/168 |
| D528,106 S | 9/2006 | Lee et al. |
| D529,024 S | 9/2006 | Daw et al. |
| 7,113,111 B2 | 9/2006 | Tyneski et al. |
| D529,909 S | 10/2006 | Daw et al. |
| D530,322 S | 10/2006 | Rak et al. |
| D533,172 S | 12/2006 | Lee et al. |
| D533,173 S | 12/2006 | Lee et al. |
| 7,153,212 B1 | 12/2006 | Karten et al. |
| 7,238,024 B2 | 7/2007 | Rehbein et al. |
| 7,298,851 B1 | 11/2007 | Hendricks et al. |
| D558,202 S | 12/2007 | Choi et al. |
| 7,304,635 B2 | 12/2007 | Seet et al. |
| 7,313,255 B2 | 12/2007 | Machida et al. |
| D561,723 S | 2/2008 | Kim et al. |
| 7,355,591 B2 | 4/2008 | Sugimoto |
| 7,374,142 B2 | 5/2008 | Carnevali |
| D572,393 S | 7/2008 | Johnston et al. |
| 7,460,108 B2 | 12/2008 | Tamura |
| D585,902 S | 2/2009 | Hobbs et al. |
| D586,803 S | 2/2009 | Whitehorn et al. |
| D591,741 S | 5/2009 | Whitehorn et al. |
| 7,548,220 B2 | 6/2009 | Silverbrook |
| 7,564,425 B2 | 7/2009 | Martinez et al. |
| 7,605,798 B2 | 10/2009 | Komatsu |
| 7,748,634 B1 | 7/2010 | Zehr et al. |
| 2001/0020932 A1 | 9/2001 | Merminod et al. |
| 2001/0050658 A1 | 12/2001 | Adams |
| 2002/0003874 A1 | 1/2002 | Peiker |
| 2002/0019950 A1 | 2/2002 | Huffman et al. |
| 2002/0050981 A1 | 5/2002 | Nuovo |
| 2002/0087555 A1 | 7/2002 | Murata |
| 2002/0184189 A1 | 12/2002 | Hay et al. |
| 2003/0014674 A1 | 1/2003 | Huffman et al. |
| 2003/0020687 A1 | 1/2003 | Sowden et al. |
| 2003/0043095 A1 | 3/2003 | Silverbrook |
| 2003/0048250 A1 | 3/2003 | Boon et al. |
| 2003/0048251 A1 | 3/2003 | Liang et al. |
| 2003/0058265 A1 | 3/2003 | Robinson et al. |
| 2003/0058521 A1 | 3/2003 | Kawai |
| 2003/0069812 A1 | 4/2003 | Yuen et al. |
| 2003/0071784 A1 | 4/2003 | Sato et al. |
| 2003/0071800 A1 | 4/2003 | Vincent et al. |
| 2003/0107603 A1 | 6/2003 | Clapper |
| 2003/0122773 A1 | 7/2003 | Washio et al. |
| 2003/0133304 A1 | 7/2003 | Wallach |
| 2003/0193795 A1 | 10/2003 | Brown |
| 2004/0026605 A1 | 2/2004 | Lee et al. |
| 2004/0047152 A1 | 3/2004 | Hung et al. |
| 2004/0148574 A1 | 7/2004 | Ohtani et al. |
| 2004/0196210 A1 | 10/2004 | Nagatsuka et al. |
| 2004/0201633 A1 | 10/2004 | Barsness et al. |
| 2005/0012723 A1 | 1/2005 | Pallakoff |
| 2005/0052419 A1 | 3/2005 | Burroughs |
| 2005/0091431 A1 | 4/2005 | Olodort et al. |
| 2005/0146506 A1 | 7/2005 | Goszyk et al. |
| 2005/0190083 A1 | 9/2005 | Tyneski et al. |
| 2005/0247845 A1 | 11/2005 | Li et al. |
| 2005/0264540 A1 | 12/2005 | Niwa |
| 2005/0284993 A1 | 12/2005 | Ternus et al. |
| 2006/0020469 A1 | 1/2006 | Rast |
| 2006/0041839 A1 | 2/2006 | Kassan |
| 2006/0098899 A1 | 5/2006 | King et al. |
| 2006/0187142 A1 | 8/2006 | Lesniak |
| 2006/0194181 A1 | 8/2006 | Rosenberg |
| 2006/0209012 A1 | 9/2006 | Hagood, IV |
| 2006/0232565 A1 | 10/2006 | Drevnig |
| 2006/0236263 A1 | 10/2006 | Bathiche et al. |
| 2006/0281058 A1 | 12/2006 | Mangoaela |
| 2007/0002024 A1 | 1/2007 | Goszyk |
| 2007/0013662 A1 | 1/2007 | Fauth |
| 2007/0035661 A1 | 2/2007 | Resner et al. |
| 2007/0097490 A1 | 5/2007 | Kanbe |
| 2007/0111177 A1 | 5/2007 | Rifkin |

(56) References Cited

U.S. PATENT DOCUMENTS

| | | | |
|---|---|---|---|
| 2007/0133014 A1 | 6/2007 | Lee | |
| 2007/0206262 A1 | 9/2007 | Zhou | |
| 2007/0273637 A1 | 11/2007 | Zhou et al. | |
| 2008/0040692 A1 | 2/2008 | Sunday et al. | |
| 2008/0076103 A1 | 3/2008 | Wallace | |
| 2008/0141180 A1 | 6/2008 | Reed et al. | |
| 2008/0145828 A1 | 6/2008 | Yu | |
| 2008/0198184 A1 | 8/2008 | Schellingerhout et al. | |
| 2008/0215895 A1 | 9/2008 | Hendricks | |
| 2008/0259057 A1* | 10/2008 | Brons | 345/184 |
| 2008/0295039 A1 | 11/2008 | Nguyen et al. | |
| 2009/0021478 A1 | 1/2009 | Lin et al. | |
| 2009/0102805 A1* | 4/2009 | Meijer et al. | 345/173 |
| 2009/0186647 A1 | 7/2009 | Smart et al. | |
| 2009/0313020 A1* | 12/2009 | Koivunen | 704/260 |
| 2010/0070281 A1* | 3/2010 | Conkie et al. | 704/260 |
| 2011/0039602 A1 | 2/2011 | McNamara et al. | |

OTHER PUBLICATIONS

Utility U.S. Appl. No. 11/277,893, filed Mar. 29, 2006, entitled "Handheld Electronic Book Reader Device Having Dual Displays", Gregg Elliott Zehr, Symon J. Whitehorn.

Utility U.S. Appl. No. 11/277,898, filed Mar. 29, 2006, entitled "Page Turner for Handheld Electronic Book Reader Device", Greg Elliott Zehr, Thomas J. Hobbs, John E. Johnston, Jateen P. Parekh, Symon J. Whitehorn.

Design U.S. Appl. No. 29/246,293, filed Mar. 29, 2006, entitled "Electronic Media Reader Display", Symon J. Whitehorn, Gregg Elliott Zehr.

Design U.S. Appl. No. 29/246,294, filed Mar. 29, 2006, "Electronic Media Reader Keypad", Thomas J. Hobbs, John E. Johnston, Gregg Elliott Zehr.

Design U.S. Appl. No. 29/246,295, filed Mar. 29, 2006, entitled "Wedge-Shaped Electronic Media Reader", Symon J. Whitehorn, Gregg Elliott Zehr.

Apple MacBook Pro Deisgn, retrieved on Mar. 16, 2007 at <<http://www.apple.com/macbookpro/design.html>>, 1 page.

Bookeen, "Cybook: the neverending book", retrieved from the internet on Oct. 22, 2007 at <<http://www.bookeen.com/ebook/ebook-reading-device.aspx>>, 2 pages.

Captain, "Word Wrap", Jun. 2007, Popular Science, p. 21.

"E Ink: Hanlin eReader V2", retrieved from the internet on Oct. 22, 2007 at <<http://www.jinke.com.cn/compagesql/English/embedpro/prodetail.asp?id=20>>, 2 pages.

"E-book device", Wikipedia, retrieved from the internet on Oct. 22, 2007 at <<http://en.wikipedia.org/wiki/E-book_device>>, 2 pages.

"eBook User's Guide Version 1.0", Thomson Consumer Electronics, Inc. NuvoMedia, Inc. 1995-2000.

"Amazon Kindle: meet Amazon's e-book reader", retrieved from the internet on Nov. 20, 2007 at <<http://www.engadget.com/2006/09/11/amazon-kindle-meet-amazons-e-book-reader/, 9 pages.

"Hanlin eReader V2: Readman", Apr. 2006, Tianjin Jinke Electronics, Co. LTD 2006, 1 page.

Retrieved from the internet on Oct. 22, 2007 at <<http://upload.wikimedia.org/wikipedia/en/9/91/Iriverbook2.jpg>>, 1 page.

"iLiad", Wikipedia, retrieved from the internet on Oct. 22, 2007 at <<http://en.wikipedia.org/wiki/ILiad>>, 3 pages.

"Image: Laptop-ebook.jpg", Wikipedia, retrieved from the internet on Oct. 22, 2007 at <<http://en.wikipedia.org/wiki/Image:Laptop-ebook.jpt>>, 2 pages.

"Image:Iriverbook2.jpg", Wikipedia, retrieved from the internet on Oct. 22, 2007 at <<http://en.wikipedia.org/wiki/Image:Iriverbook2.jpg>>, 3 pages.

"New to E-Books", Club Lighthouse Publishing, retrieved from the internet on Oct. 22, 2007 at <<http://www.clublighthousepublishing.com/NEW_TO_%20EBOOKS_PAGE.htm>>, 3 pages.

NUUT e-Book, "NUUT Keyword", retrieved from the internet on Oct. 22, 2007 at <<http://nuutbook.com/html/detail.asp>>, 3 pages.

"Planet eBook—Tool Description for Planet Ebook by NetLibrary", available as early as Jun. 13, 2006 at <<http://www.planetebook.com/mainpage.asp?webpageid=15&tbtoolid=1069>>, Planet eBook 2007, 2 pages.

"Sony Librie EBR-1000EP" Wikipedia, retrieved from the internet on Oct. 22, 2007 at <<http://en.wikipedia.org/wiki/Libri%C3%A9>>, 2 pages.

"Sony Reader", Wikipedia, retrieved from the internet on Oct. 22, 2007 at <<http://en.wikipedia.org/wiki/Sony_Reader>>. 4 pages.

Sony Reader, "06 Accessories", retrieved on the internet on Mar. 16, 2007 at <<http://www.learningcenter.sony.us/assets/itpd/reader/index.html>>, 1 page.

Sony Reader Blog, "Specifications", retrieved on the internet on Mar. 16, 2007 at <<http://www.thesonyreader.com/sony-reader-specifications>>, 12 pages.

Sony Reader details and pics, "Engadget", retrieved on the internet on Mar. 16, 2007 at <<http://www.engadget.com/2006/01/06/sony-reader-details-and-pics/>>, 8 pages.

Sony Reader, "Revoluntionary paper-like display", retrieved on the internet on Mar. 16, 2007 at <<http://www.learningcentersony.us/assets/itpd/reader/reader_features.html>>, 2 pages.

"The Reader, Sony's new e-ink e-book reader—Engadget", retrieved on the internet on Mar. 16, 2007 at <<http://www.engadget.com/2006/01/04/live-shot-of-the-reader-sonys-new-e-ink-e-book-reader>>, 6 pages.

Price, et al., "XLibris: The Active Reading Machine", FX Palo Alto Laboratory, Inc., CHI 98 Summary, ACM Press, 1998, pp. 22-23., Apr. 18, 1998.

Hanlin eReader V2, E-Ink, Tianjin Jinke Electronics Co., LTD, Tianjin, Cbina, copyright 1985-2005, jinke.com.cn, 1 page.

Non-Final Office Action for U.S. Appl. No. 12/553,071, mailed on Feb. 17, 2012, John T. Kim et al., "Touch-Screen User Interface" 18 pages.

Non-Final Office Action for U.S. Appl. No. 12/553,078 mailed on Feb. 17, 2012, John T. Kim et al., "Touch-Screen User Interface", 21 pages.

Non-Final Office Action for U.S. Appl. No. 12/817,961, mailed on Feb. 29, 2012, Gregg Zehr et al, "Handheld Electronic Book Reader Device Having Dual Displays", 13 pages.

Office action for U.S. Appl. No. 12/553,076, mailed on Feb. 29, 2012, Kim et al., "Touch-Screen User Interface", 12 pages.

Final Office Action for U.S. Appl. No. 11/693,686, mailed on Apr. 6, 2012, John Johnston et al., "Mounting Accessories to an Electronic Device", 34 pages.

Non-Final Office Action for U.S. Appl. No. 11/693,686, mailed on Nov. 8, 2011, John Johnston, "Mounting Accessories to an Electronic Device", 26 pages.

PCT Search Report mailed Feb. 1, 2011.

* cited by examiner

TOUCH-SCREEN USER INTERFACE

BACKGROUND

A large and growing population of users is enjoying entertainment through the consumption of digital media items, such as music, movies, images, electronic books, and so on. The users employ various electronic devices to consume such media items. Among these electronic devices are electronic book readers, cellular telephones, personal digital assistant (PDA), portable media players, tablet computers, netbooks, and the like. One particular device that is gaining in popularity is the dedicated electronic book ("eBook") reader device, which attempt to mimic the experience of reading a conventional book through display of electronic information on one or more electronic displays. As the quantity of available media content continues to grow, along with increasing proliferation of such dedicated devices to consume that media content, finding ways to enhance user experience continues to be a priority. As eBook readers continue to evolve, there remains a need for improving a reader's ability to hold and interact with the readers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to user interfaces for a handheld electronic book ("eBook") reader device designed to allow users to read electronic content (e.g., text, graphics, multimedia, and the like), such as that found in electronic books, magazines, RSS feeds, newspapers, and the like. To improve user interaction, the display mounted in the eBook reader device is a touch-screen display capable of functioning as both an input and an output device.

The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any content that is in electronic or digital format.

With such eBooks, the content may be structured as virtual frames presented on the device and a user may turn or change from one virtual frame or "page" of electronic content to another. It is further noted that various aspects and features described herein may be implemented in other electronic devices or electronic readers besides eBook reader devices including, for example, portable computers, personal digital assistants (PDAs), portable gaming devices, wireless phones, and the like.

The user interfaces described herein utilize the functionality of a display, which also includes a touch screen. By generating input through touching the displayed "page" the user interfaces described below provide an intuitive mechanism for a user to interact with the eBook reader device.

Illustrative eBook Reader Device Architecture

Figure 1:
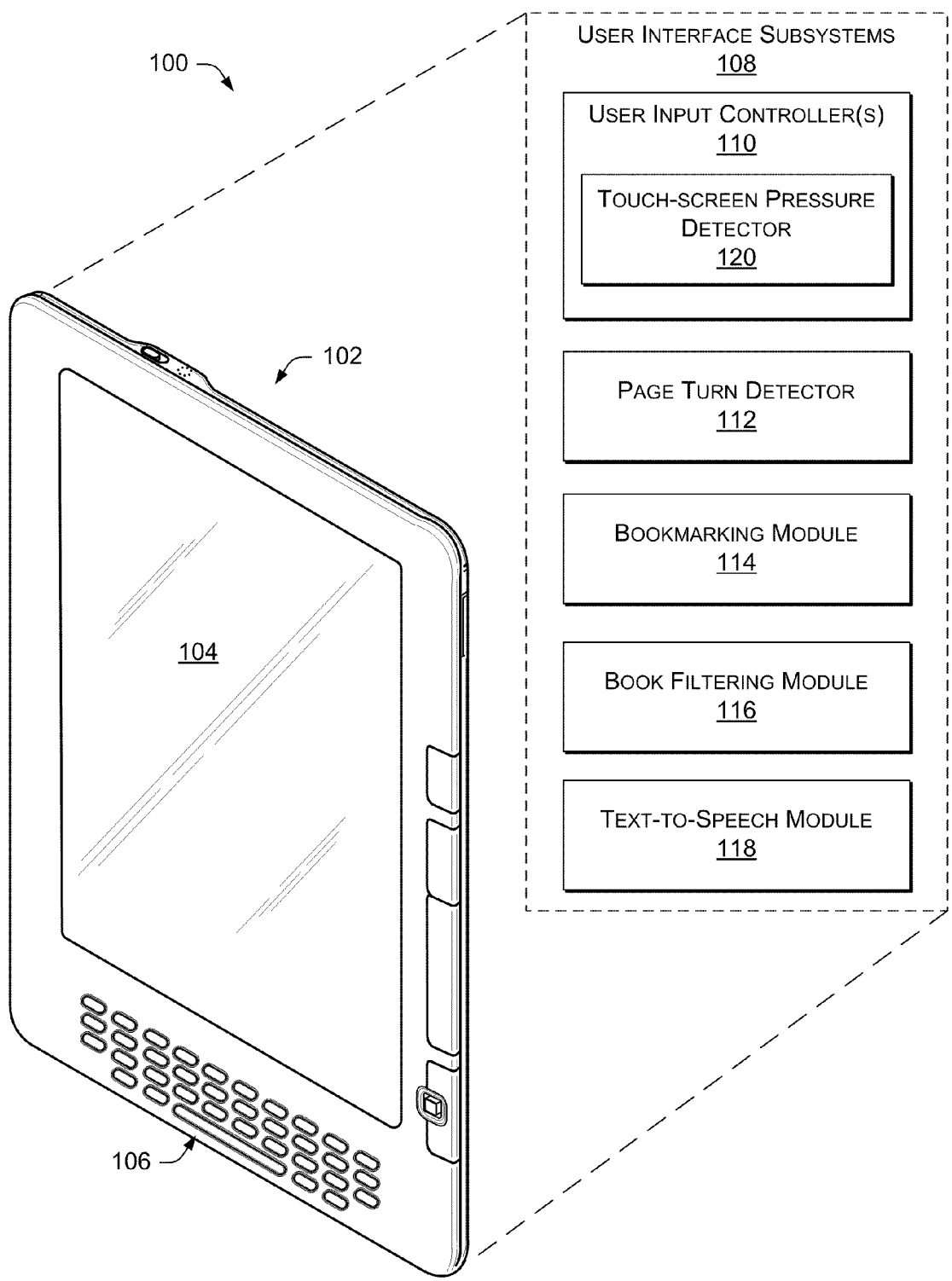
FIG. 1 illustrates one illustrative implementation of a handheld electronic book ("eBook") reader device and a block diagram showing illustrative components that may be implemented in the eBook reader device.

FIG. 1 illustrates an illustrative device architecture 100 which, in one possible implementation, is a handheld dedicated eBook reader device 102. The eBook reader device 102 has a touch-screen display 104. The eBook reader device 102 may also include a keyboard 106 or other types of actuatable elements that may have dedicated or assigned operations. For instance, the device 102 may have a power on/off button, selection keys, joystick, touchpad, and so forth.

The touch-screen display 104 presents content in a human-readable format to a user. The content presented in the touch-screen display 104 may take the form of electronic books, newspapers, or other readable or viewable materials. For example, the touch-screen display 104 provides the text of the electronic books and also depicts any illustrations, tables, or graphic elements that might be contained in the electronic books. The touch-screen display 104 is implemented with touch-sensitive technology which is responsive to user input registered via, for example, a finger, a stylus, or other similar pointing device.

As illustrated in FIG. 1, the eBook reader device 102 has various internal components, which include user interface subsystems 108. Examples of such components may include one or more user input controller(s) 110, a page turn detector 112, a bookmarking module 114, a book filtering module 116, and a text-to-speech module 118. The one or more user input controllers 110 are also provided to capture user input via the touch-screen 104, the keyboard 106, and any other user input element on the eBook reader device 102.

In some implementations, the one or more user input controller(s) 110 may include a touch-screen pressure detector 120. The touch-screen pressure detector 120 detects not only the presence of pressure against the touch-screen display 104, but also an amount of pressure applied to the touch-screen display 104. By detecting pressure as a continually-variable input rather than simply as an on/off binary input, the touch-screen pressure detector 120 can differentiate between a soft touch and a hard touch in addition to detecting direction and speed of contact with the touch-screen 104. The touch-screen pressure detector 120 can provide three-dimensional input by detecting where on the screen pressure is applied (i.e., x-dimension and y-dimension) and the amount of pressure applied to that point (i.e., z-dimension). Thus, the same pressure applied to different points on the surface of the touch-screen (e.g., lower-left hand corner or upper-right hand corner) generates different input signals as well as different pressure applied to the same point on the surface of the touch-screen (e.g., hard versus soft pressure on a point on the screen).

User input may be further differentiated by duration. In some implementations, the amount of time that the touch-screen display 104 detects pressure generates a different input signal. Duration or time of contact may be thought of as providing an alternative third dimension (i.e., time of contact is the z-dimension instead of pressure) or time may supply a fourth dimension in addition to pressure (i.e., x-dimension, y-dimension, pressure, and time). For example, pressing a location on the display 104 for a short period of time may signal a page-turn command while pressing the same location for a long period of time may signal a bookmark command. Furthermore, a short, hard pressure; a short, soft pressure; a long, hard pressure; and a long, soft pressure may all correspond to a different commands or inputs.

In addition to pressure at a single point, a force applied to an area may be discernable by the touch-screen pressure detector 120. In some implementations, the force is calculated by summing the pressure detected at several points. For example, a user's thumb may contact several pressure sensors simultaneously due to the size and shape of a thumb. In this example, the pressure detected by all the sensors contacted by the thumb may be summed to determine an amount of force.

The page turn detector 112 detects an input corresponding to a command to change the displayed page on the eBook reader device 102. The command may be generated by a key on the keyboard 106, an object such as the user's finger swiped across the touch-screen display 104, a pressure applied to a point on the touch-screen display 104, and the like. Examples of page turning mechanisms are described below in more detail with reference to FIGS. 2-4.

The term "page" as used herein refers to a collection of content that is presented at one time in the touch-screen display 104. Thus, a "page" as described herein may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the touch-screen display 104.

The bookmarking module 114 bookmarks a page so that the user may rapidly return to the page after viewing other pages. In some implementations, the bookmarking module 114 operates in conjunction with the page turn detector 112. Examples of bookmarking mechanisms are described below in more detail with reference to FIGS. 5-7.

A book filtering module 116 is provided to identify and filter books stored on, or accessible by, the eBook reader device 102 according to either book size or a time-based parameter. The book filtering module 116 orders a list of books for display on the eBook reader device, and the ordered list may include visual elements to convey length or duration of the books. Responsive to user input, the book filtering module 116 may further filter the list to form subset lists. Examples of filtering mechanisms are provided below in more detail with reference to FIGS. 8-12.

The text-to-speech module 118 converts text displayed on the touch-screen display 104 into an audible reading of the text. The text for conversion to speech may be indicated by an object on or near the touch-screen display 104 such as the user's finger moving over the displayed text. Examples of user interfaces for text-to-speech conversion are described below in more detail with reference to FIG. 13.

Figure 2:
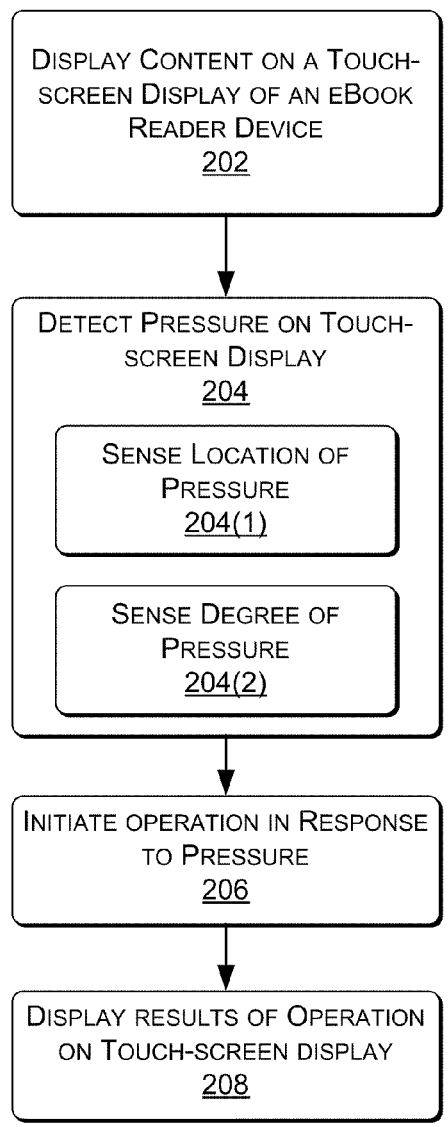
FIG. 2 is a flow diagram illustrating an illustrative process of using a touch-screen user interface to initiate various operations.

FIG. 2 shows a process 200 for using a touch-screen user interface to initiate various operations, such as turning pages, bookmarking pages, filtering books according to size, and converting text to speech. For ease of understanding, the process 200 (as well as processes 500 in FIG. 5, 900 in FIG. 9, 1200 in FIGS. 12, and 1600 in FIG. 16) is delineated as separate acts or operations represented as independent blocks. However, these separately delineated acts should not be construed as necessarily order dependent in their performance. The order in which the process is described is not intended to be construed as a limitation, and any number of the described process blocks maybe be combined in any order to implement the process, or an alternate process. Moreover, it is also possible that one or more of the provided processes will be omitted.

At 202, content is displayed on a touch-screen display 104 of the eBook reader device 102. The content may be text from an electronic document, or it may be a list of items (such as book titles), or other text-based components.

At 204, a pressure applied by an object on the touch-screen display is detected. As noted above, the object may be a human finger, a stylus, or other type of pointing mechanism. In one implementation, the touch-screen pressure detector 120 detects both placement of the object on the touch-screen display 104 at 204(1), as well as an amount of pressure being applied by the object to the touch-screen display 104 at 204(2). In some cases, the placement of the object may be a point within a region. In other cases, the placement may be interpreted as a swipe across the touch-screen display.

At 206, an operation is initiated in response to the application of the object to the touch-screen display. There may be any number of operations that can utilize varying degrees of pressure to execute the operation in different ways. In one scenario, the operation may be turning pages in an electronic book. For instance, the page turning detector 112 may turn one or more pages depending upon the amount of pressure applied to the touch-screen display. In another scenario, the operation may be bookmarking a page, where the bookmarking module 114 interprets pressured applied to a particular region as a command to bookmark the page temporarily. These and other scenarios are described below in more detail.

At 208, the results of the operation are displayed on the touch-screen display. Depending on the operations being performed, the results will vary widely. Example results for the scenarios just discussed may be a new page, or redisplay of a bookmarked page.

Figure 3:
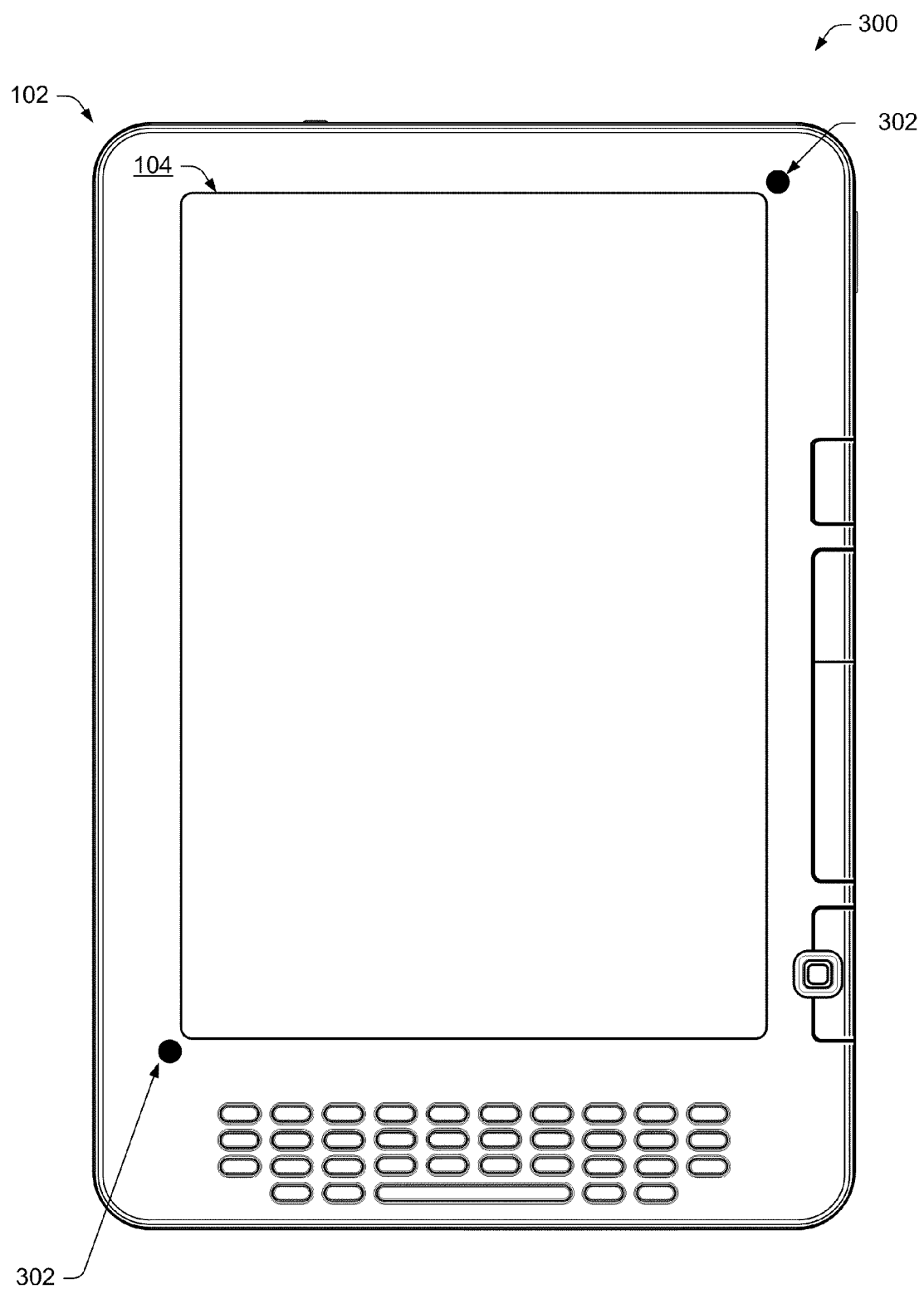
FIG. 3 is a front plan view of the eBook reader device illustrating a plurality of microphones positioned near the display.

FIG. 3 shows an alternate implementation of the touch-screen display 104 of the eBook reader device 102 shown in FIG. 1. In this implementation, three-dimensional input may be generated by two or more microphones 302 instead of, or in conjunction with, a touch screen that senses pressure. The microphones 302 may detect the sound of an object tapping the surface of the display 104 of the eBook reader device 102. The object may be a stylus, a fingernail, or the like. Comparison of the relative volume of the sounds detected by each microphone 302 may be used to calculate a relative distance from each microphone 302, and thus, a position on the surface of the display 104. With two microphones, a quadrant of the display (e.g., upper-right, lower-right) may be identified. With three or more microphones 302, a more specific position on the display 104 may be triangulated. The microphones 302 may be integrated into the housing of the eBook reader device 102 at or near one or more corners of the display 104. The third dimension (i.e., z-dimension) may be determined by distinguishing between a loud tap and a soft tap. A loud tap can be correlated with a greater amount of force and a soft tap can be correlated with a lesser amount of force. The total volume detected by all the microphones 302 may be summed to determine the loudness of a tap.

These are but a few examples. More details of possible scenarios are provided below with reference to FIGS. 4-19. However, these examples are non-limiting and the architecture 100 may be used to support other configurations and usage scenarios.

Page Turning Based on Force

In the first usage scenario, page turning in an eBook reader device is achieved by sensing pressure applied in different ways to the touch-screen user interface. Depending on the force or gesture, one or more pages may be turned forward or backward. Examples are described below with reference to FIGS. 4-6.

Figure 4:
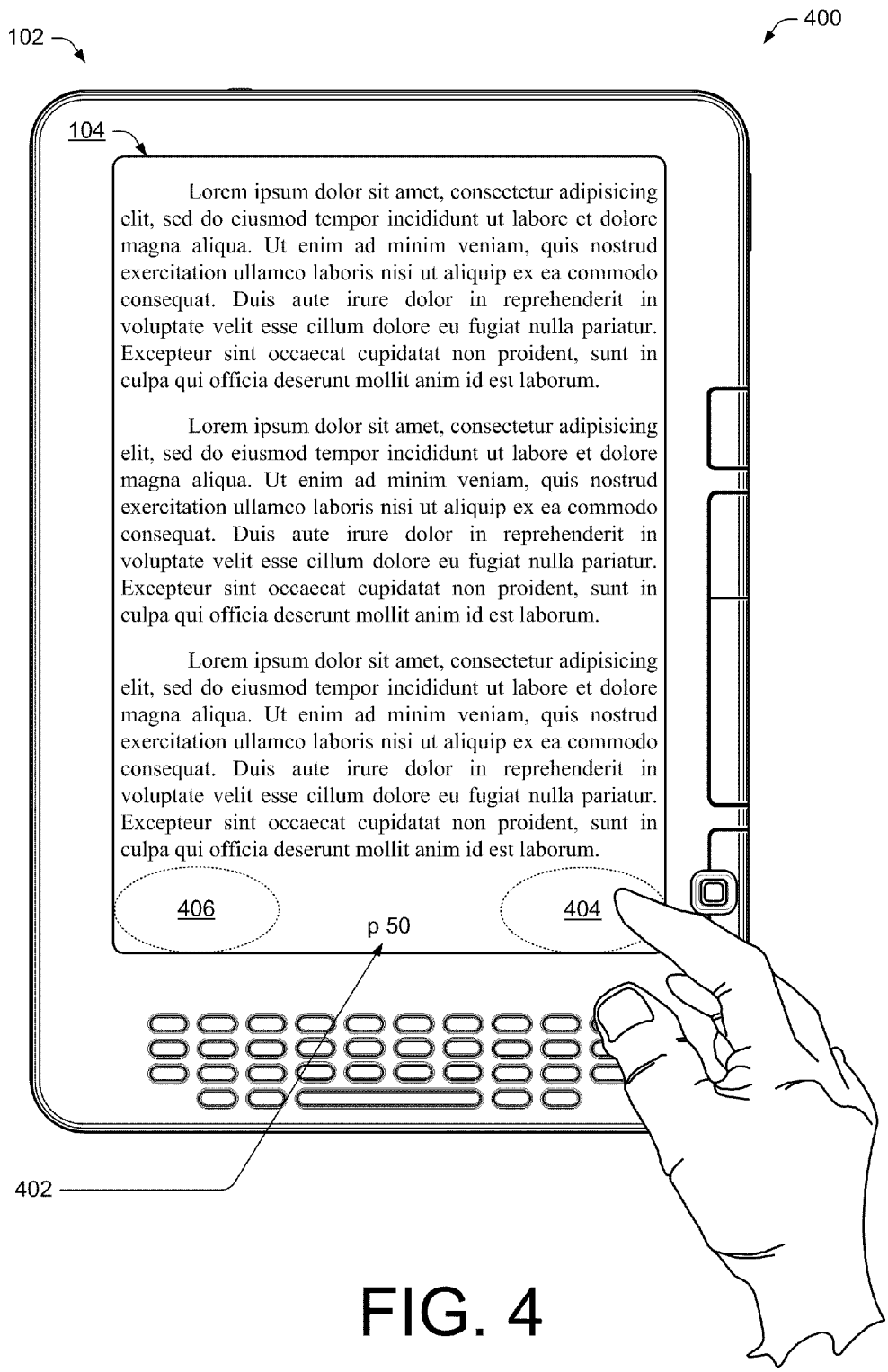
FIG. 4 is a front plan view of the eBook reader device illustrating a touch-screen display page turning mechanism.

FIG. 4 shows a user interface representation 400 of the handheld eBook reader device 102 displaying a page of text on the touch-screen display 104. Pressure on the touch-screen display 104 by an object such as the user's finger or a stylus may cause the eBook reader device 102 to display a different page of an electronic document analogous to turning a page of a physical book. The page turn detector 112 may analyze input received by the touch-screen display 104 to implement a page-turn command.

Recall from above that a "page" as described herein may be understood as a virtual frame of the content, or a visual display window presenting the content to the user. The pages presented on the eBook reader device 102 and turned using the touch-screen display 104 may not correspond directly to the identical hard pages in the associated physical book. Depending on display capabilities, font size, and other such parameters, any given "page" displayed on the eBook reader device 102 may contain more or less text/graphics than the corresponding hard page. Thus, the page turning mechanism 112 turns pages in the sense of changing from one display frame to another. A visual representation of a "page," such as a page number 302, may assist the user in distinguishing one page from another. In this example, the page number is "50". Additionally, a visual representation of turning pages, such as a changing page number, may provide visual confirmation that pages are turning In other implementations, a graphic element such as a representation of book with turning pages may be displayed instead of or together with the page number to provide a visual representation of the turning pages. Further, in place of page numbers, a progress graphic may be used to represent the user's progress through the content. Audio and/or haptic feedback may also be used to provide an indication of pages turning For example, a sound of actual paper pages of a book being turned could be played each time the "page" of an eBook is turned.

In one implementation, specific regions of the touch-screen display 104 may be configured to be responsive to pressure, such that when pressed by the user, initiates functions to turn pages forward or backwards. In FIG. 4, the screen UI includes two regions: a region 404 for turning pages forward and a region 406 for turning pages backwards. In one implementation, the region 404 for turning pages forward is located in the lower right side of the touch-screen display 104 and the region 406 for turning pages backwards is located in the lower left side of the touch-screen display 104. In these locations, the user can hold the eBook reader device 102 with two hands, and turn pages of an electronic document using his or her right and left thumbs, similar to how the user would leaf through a physical paperback book. The regions 404 and 406 may be sized appropriately to accommodate the user's thumb.

In some embodiments, the region 404 for turning pages forward may occupy the entire right half of the touch-screen display 104 and the region 406 for turning pages backwards may occupy the entire left half of the touch-screen display 104. The correlation between right-forward and left-backwards may be switched based on user settings or language of the displayed document. In other implementations, the region for turning pages forwards may be at the bottom of the touch-screen display 104 and the region for turning pages backwards may be at the top of the touch-screen display 104. Location of the regions 404, 406 may also depend on the orientation of the eBook reader device 102 such that if the user rotates the eBook reader device 102 the location of the page-turn regions 404, 406 moves accordingly. Orientation of the eBook reader device 102 may be detected, in some implementations, by an accelerometer integrated into the device. For example, the page-turn regions 404, 406 may stay in the lower-right and lower-left corners of the touch-screen display 104 as the eBook reader device 102 is rotated.

As discussed above, the touch-screen pressure detector 120 detects an amount of pressure or force applied to the touch-screen display 104. The number of pages turned may be proportional to the amount of pressure placed on one of the page-turn regions 404, 406. As a larger amount of force is applied to a page-turn region 404, 406, a greater number of pages are turned in proportion to the amount of force. Mechanical force may be applied to a page-turn region 404, 406 by any means. For instance, the user may place her thumb on the touch-screen display 104 and "pinch" the eBook reader device 102 between her thumb and her index finger. As another approach, the user may place the eBook reader device 102 on a table and pressing down with a stylus.

In other implementations, the speed at which pages turn may vary in proportion to the amount of pressure applied to a page-turn region 404, 406. More pressure may cause the pages to turn faster. The number of pages turned and the speed of pages turning may both vary proportionally to the amount of pressure. For example, greater pressure on one of the page-turn regions 404, 406 may cause more pages to turn and the pages to turn faster. A threshold amount of force for turning a greater number of pages and/or for turning pages at a faster speed may be adjustable by the user. For example, the user may define an amount of pressure as the force necessary to turn ten pages at one time. The user may also define an amount of pressure, for example, as the pressure necessary to turn 60 pages a minute.

Alternatively, the threshold amount may be inferred over time from observing user behavior. If the user consistently pages backwards after applying a pressure to turn pages, it may be inferred that the user did not want to turn that many pages for the applied pressure. Hence, the next time the same pressure is applied, the device may turn fewer pages.

Gestures other than press-and-hold may generate page-turn commands. For example, swiping an object (e.g., finger, stylus, etc.) across the touch-screen 104 may generate a page-turn command. The number of pages turned may increase in proportion an amount of force applied against the touch-screen 104 during the swiping gesture. Turning pages with swiping gestures are described in more detail below with reference to FIG. 7. The number of pages turned may also depend on a number of fingers used for the swiping gesture or pressed against the page-turn regions 404, 406. For example, one finger turns one page, two fingers turns two pages, three fingers turns three pages, and so forth. Alternative correlations between the number of fingers and the number of turned pages are also possible.

In some circumstances, the user may desire automatic page turning so that the next page will be displayed without user input. In order to allow the user sufficient time to read a page before the automatic turning, but not so much time that the user is waiting excessively for the next page to be displayed, a speed of the automatic page turning may be based on an average of previous manual page turning speeds. For example, if over the last three pages of a displayed document the user has entered a manual page turn command after 20, 21, and 19 second intervals, the eBook reader device 102 may begin automatically turning pages every 20 seconds. In some implementations, a user input initiating automatic page turning is required.

Figure 5:
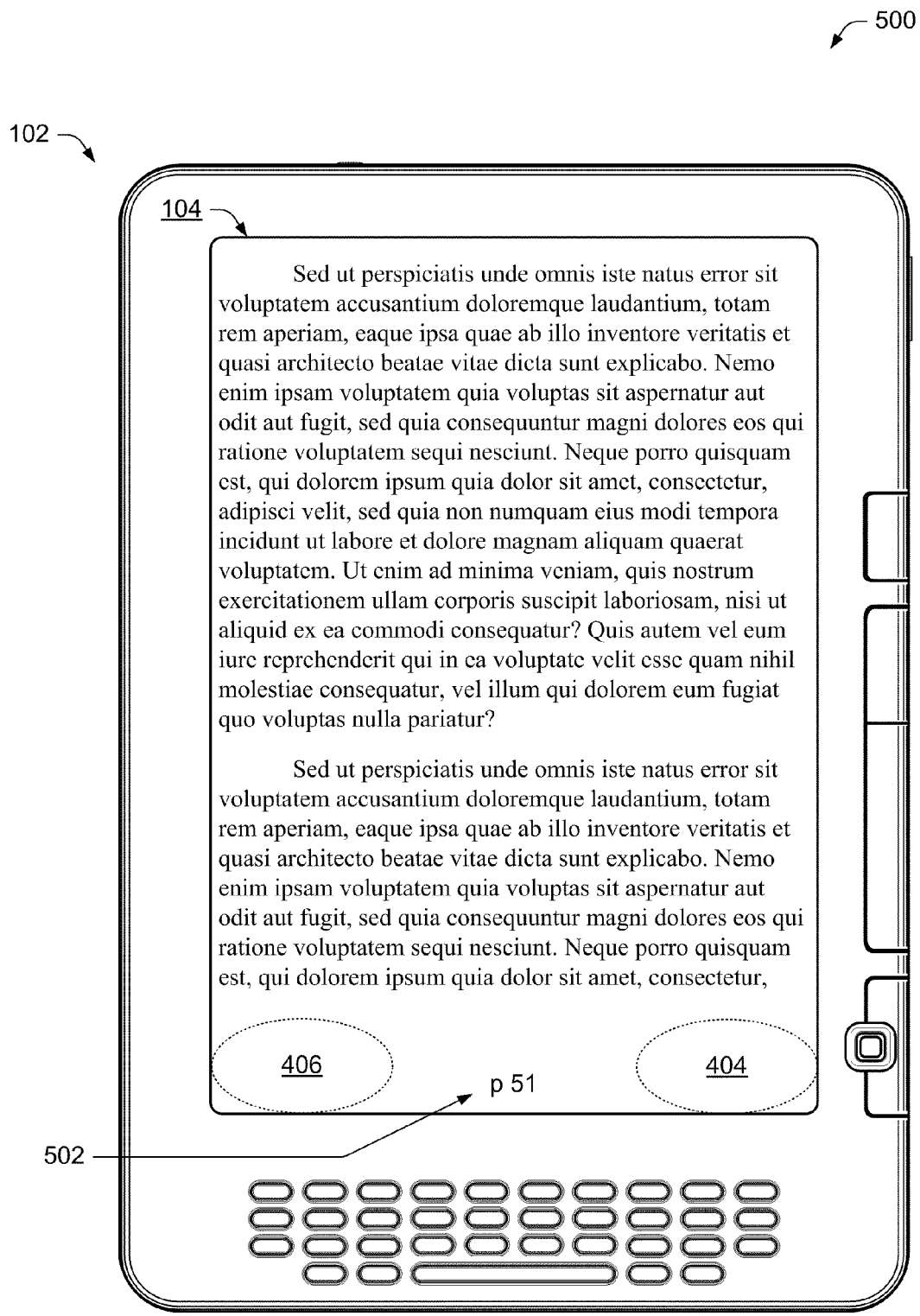
FIG. 5 illustrates another view of the touch-screen display page turning mechanism.

FIG. 5 shows a user interface representation 500 displaying a next page of text on the touch-screen display 104 of the eBook reader device 102, following from a page turning operation by the device 102 as shown in FIG. 4. A visual representation of a displayed page is indicated by a page number 502. In this example, the page number is "51" which represents one page "forward" relative to the page number "50" shown in FIG. 4. The change in pages from FIG. 4 to FIG. 5 resulted from pressure applied to the forward page-turn region 404 such that the amount of force exerted against the touch-screen display 104 correlated with turning one page. In some embodiments, a greater amount of force applied to the page-turn region 404 will turn more than one page at a time. Turning pages backwards functions in analogous manner in response to pressure on the backward page-turn region 406.

While the pages are "turning", the eBook reader device 102 and/or the display 104 may require time for processing or refreshing the displayed image. Particularly, when many pages are turned at one time, the transition between pages may not be instantaneous. In embodiments where the user interface displays the visual representation of the turning pages, the visual representation may be displayed during the transition time. For example, changing from page 50 to page 51 may be represented by scrolling numbers similar to digits displayed in an automobile odometer. In other embodiments, page 50 may visually morph to page 51, such as through visual techniques that represent a page turning in a physical book.

Figure 6:
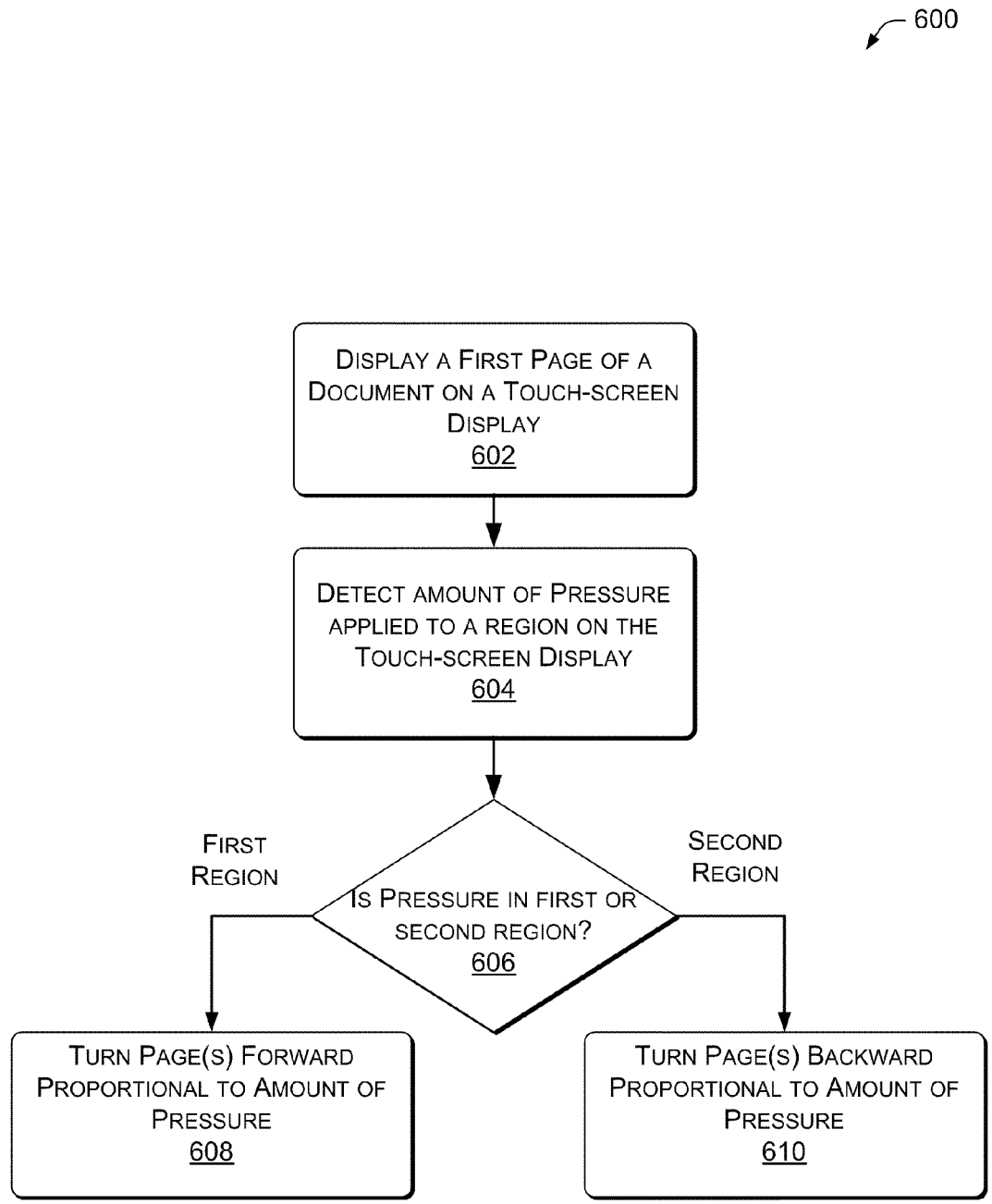
FIG. 6 is a flow diagram illustrating an illustrative process of turning pages using the touch-screen display of the eBook reader device.

FIG. 6 shows a process 600 for turning pages using the touch-screen display 104 of the eBook reader device 102. At 602, a first page of an electronic document is displayed on the touch-screen display 104 of the eBook reader device 102. This is shown, for example, in the user interface representation 400 in FIG. 4, where a first page "50" is displayed.

At 604, an amount of pressured is detected within a region on the touch-screen display. In the implementation described above, for example, the pressure may be applied by an object to either the forward page-turn region 404 or the backward page-turn region 406.

At 606, a determination is made whether the pressure is applied in the first or second region. If applied to the first region (e.g., the "first region" branch from 606), one or more pages are turned forward in proportion to the amount of pressured applied to the first region at 608. If applied to the second region (e.g., the "second region" branch from 606), one or more pages are turned backward in proportion to the amount of pressured applied to the first region at 610.

Snapping Back to a Bookmarked Page

In another usage scenario, a user may wish to mark one page, flip to another page, and then return to the previously marked page. This manipulation may be achieved with a physical book by book marking the page that the user wishes to return to by placing a finger on the page or inserting a bookmark. As described below in reference to FIGS. 7-10, analogous bookmarking may be achieved with the eBook reader device 102. These bookmarking techniques leverage aspects of the touch-screen user interface of the eBook reader device, as will be described below in more detail.

Figure 7:
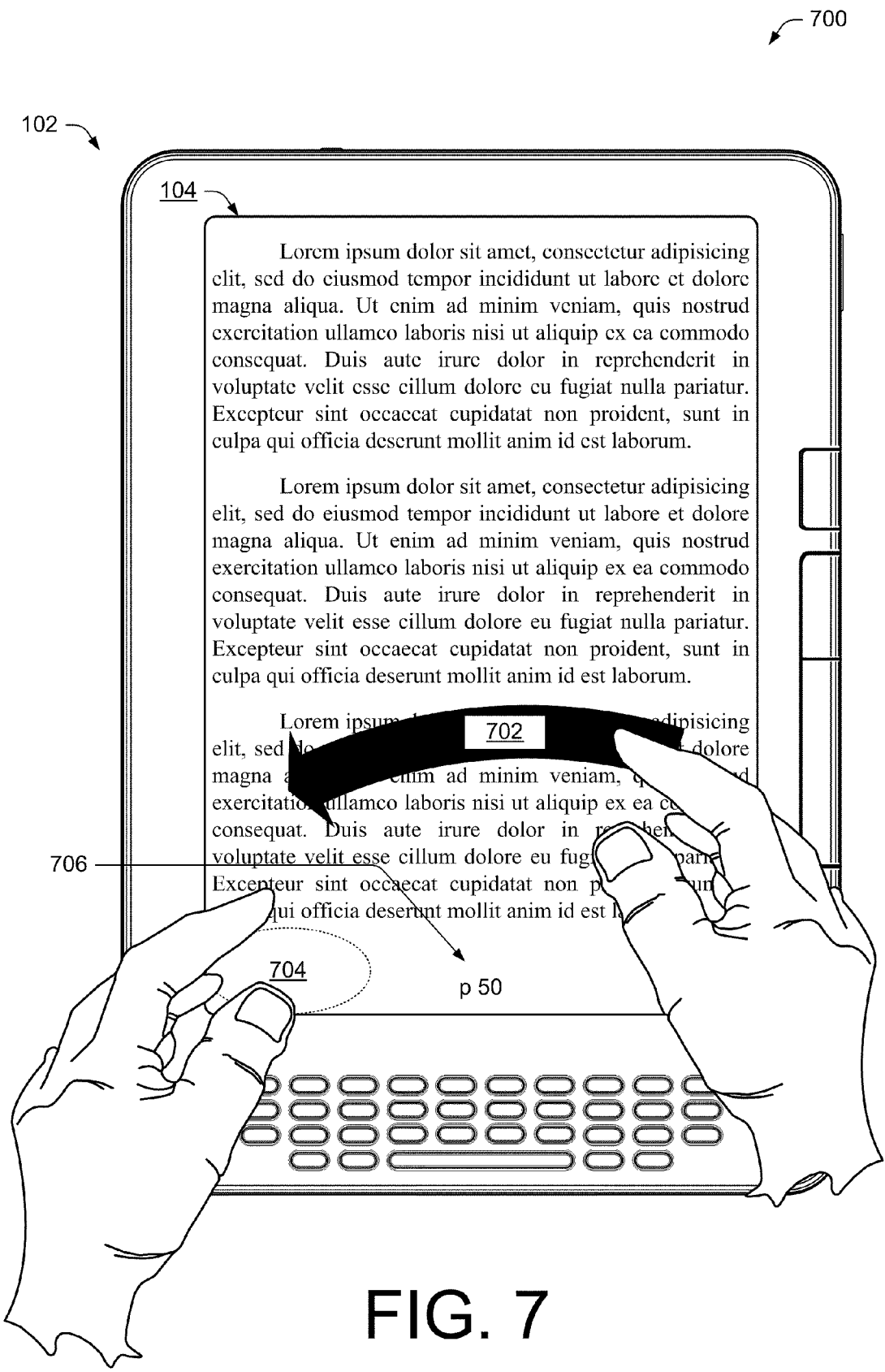
FIG. 7 illustrates another page turning mechanism and a mechanism for bookmarking a page.

FIG. 7 shows a user interface representation 700 of the eBook reader device 102 for displaying a page of text on the touch-screen display 104 while receiving a page-turn command. In this implementation, the page-turn command is generated by a gesture 702 made by an object on or near the touch-screen display 104. The gesture 702 may be generated by a user swiping his finger across the surface of the touch-screen display 104. The user input controller(s) 110 may determine the direction of the swiping gesture. The page turn detector 112 may interpret the received input as a command to turn pages forward or turn pages backwards. FIG. 7 shows a gesture 702 made from right to left. The right-to-left gesture may correlate with a command to turn pages forwards. Similarly, a swiping motion from left to right may correlate with a command to turn pages backwards. Motions from top to bottom and bottom to top may also be used to turn pages. In some implementations, direct contact with the touch-screen display 104 is not necessary for detection of the object making the swiping gesture. For example, a camera may optically track a user's hand, or other object such as a stylus, as it moves across the screen relative to the camera. As an additional or alternative motion tracking mechanism, an infrared light emitting diode may emit light that is reflected back to a detector such that the emitter/detector combination can correlate a disturbance in the emitted light with the location of an object near the screen. Further, in some implementations, the page-turn command may be an actuation of a control that is not part of the touch-screen display, such as a button or joystick along the side of the eBook reader device 102.

In one implementation, the user interface 700 shown in FIG. 7 may also include a defined area 704 of the touch-screen 104 which, when pressed by the user, indicates that the currently displayed page is a page the user wishes to bookmark. The bookmarking module 114 may function to interpret the pressure applied to the defined area 704 as an indication that the bookmark should be set for the displayed page. Thus, the defined area 704 serves as a button to bookmark a page. In one implementation, the bookmark button 704 is located in the lower-left corner of the touch-screen display 104. In this configuration, the user may activate the bookmark button 704 with his left thumb while holding the eBook reader device 102 in his left hand. The bookmark button 704 is not limited to any particular shape or placement on the touch-screen display 104. For example, left-handed users may configure the eBook reader device 102 such that the bookmark button 704 is on the lower-right corner of the touch-screen display 104. In some implementations, the page displayed in FIG. 7 may also include a visual representation 706 of a page number corresponding to the displayed page (e.g., "p. 50").

Figure 8:
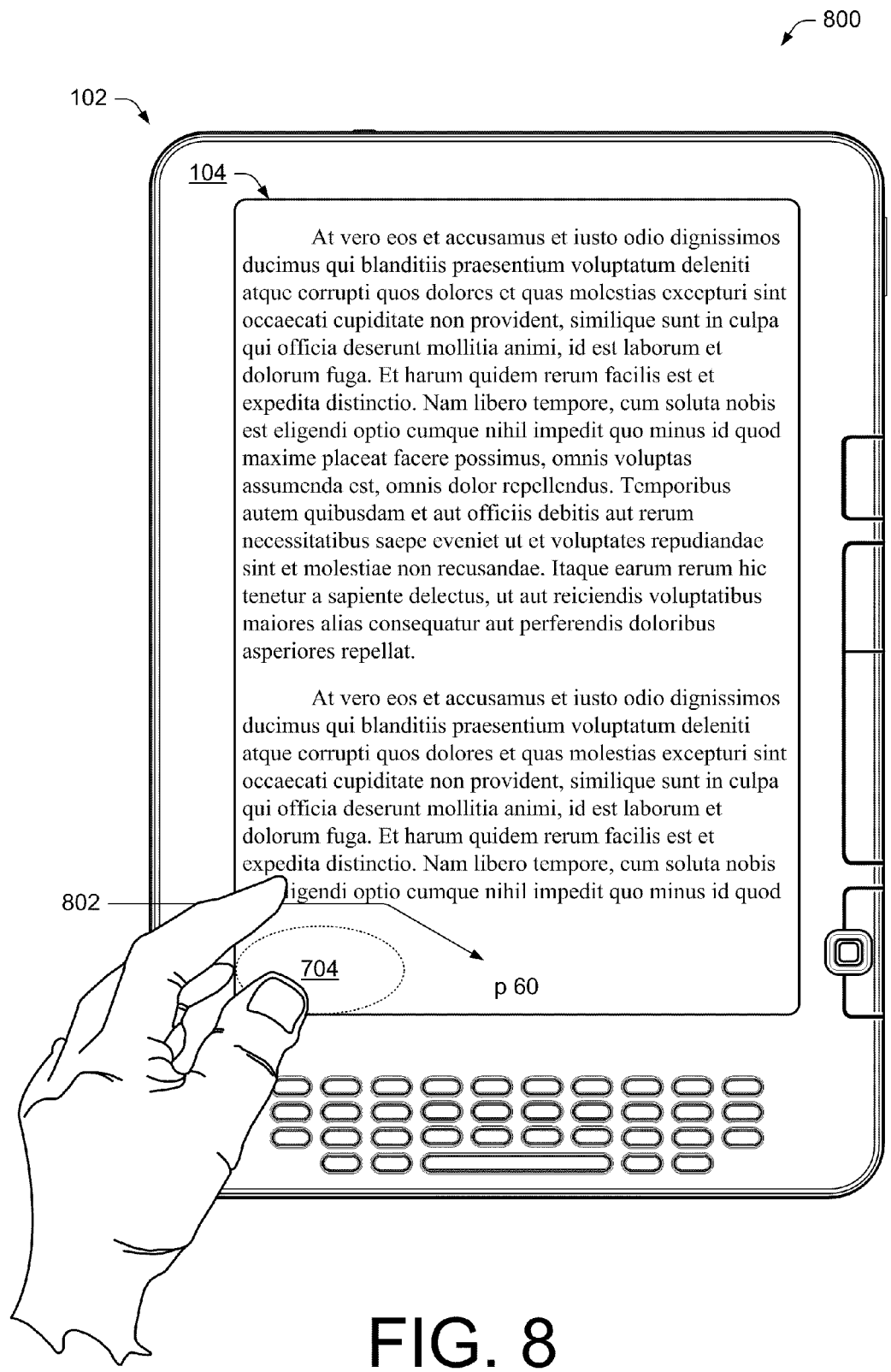
FIG. 8 illustrates the touch-screen display after the page turning

FIG. 8 shows another user interface representation 800 of the eBook reader device 102 displaying a page of text following a page-turn command. As described above, the page-turn command is processed by the page turn detector 112 in response to a gesture 702 made by an object on or near the touch-screen display 104, pressure on a page-turn region 404, 406, pressing a button on the keyboard 106, pressing one of the other controls, or the like. In this example, the visual representation 802 of the page number indicates that 10 pages were turned from page "50" shown in FIG. 7 to page "60" shown in FIG. 8.

In one implementation, page 60 is displayed as long as the pressure of the object (e.g. a finger or stylus) is detected on the bookmark button 704. Once the pressure is no longer detected on the bookmark button 704, the eBook reader device 102 redisplays the bookmarked page, which in this example is page 50 shown in FIG. 7. With this implementation, the user may hold the eBook reader device 102 with his left hand, press on the bookmark button 704 with his left thumb, and flip through pages by swiping a finger of his right hand across the touch-screen display 104. Upon releasing the left thumb, the eBook reader device 102 "snaps back" to the page that was displayed when the user placed his left thumb on the bookmark button 704.

Figure 9:
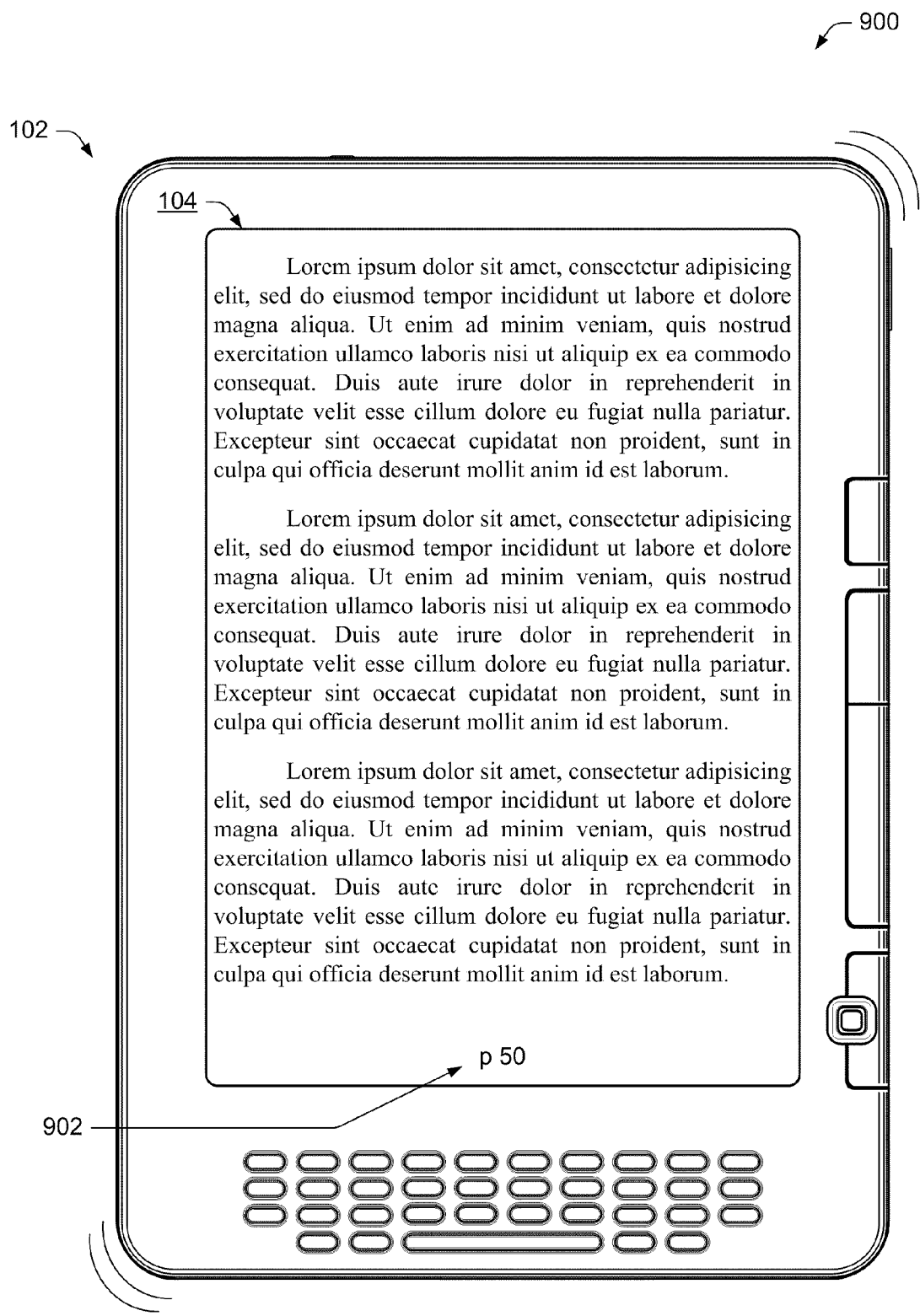
FIG. 9 illustrates a return to the bookmarked page accompanied by a haptic indication.

FIG. 9 shows a user interface representation 900 in which the eBook reader device 102 redisplays the page originally displayed in FIG. 7, but optionally accompanies this display with a haptic indication. The visual representation 902 of the page number shows that, in this example, the text has been returned to page "50". Redisplaying the bookmarked page once pressure is removed from the touch-screen display 104 may be instantaneous or near instantaneous. In one implementation, the "snap back" may occur without an accompanying visual representation of turning pages. In a same or different implementation, a haptic indication accompanies the redisplaying the bookmarked page. The haptic indication provides the user with tactile feedback analogous to turning a large number of pages of a physical book at one time. In one implementation, the haptic indication may be a vibration created by a vibrator, a low-frequency sound produced by a speaker, or the like. The haptic feedback may be accompanied, or even replaced, by audio feedback.

Figure 10:
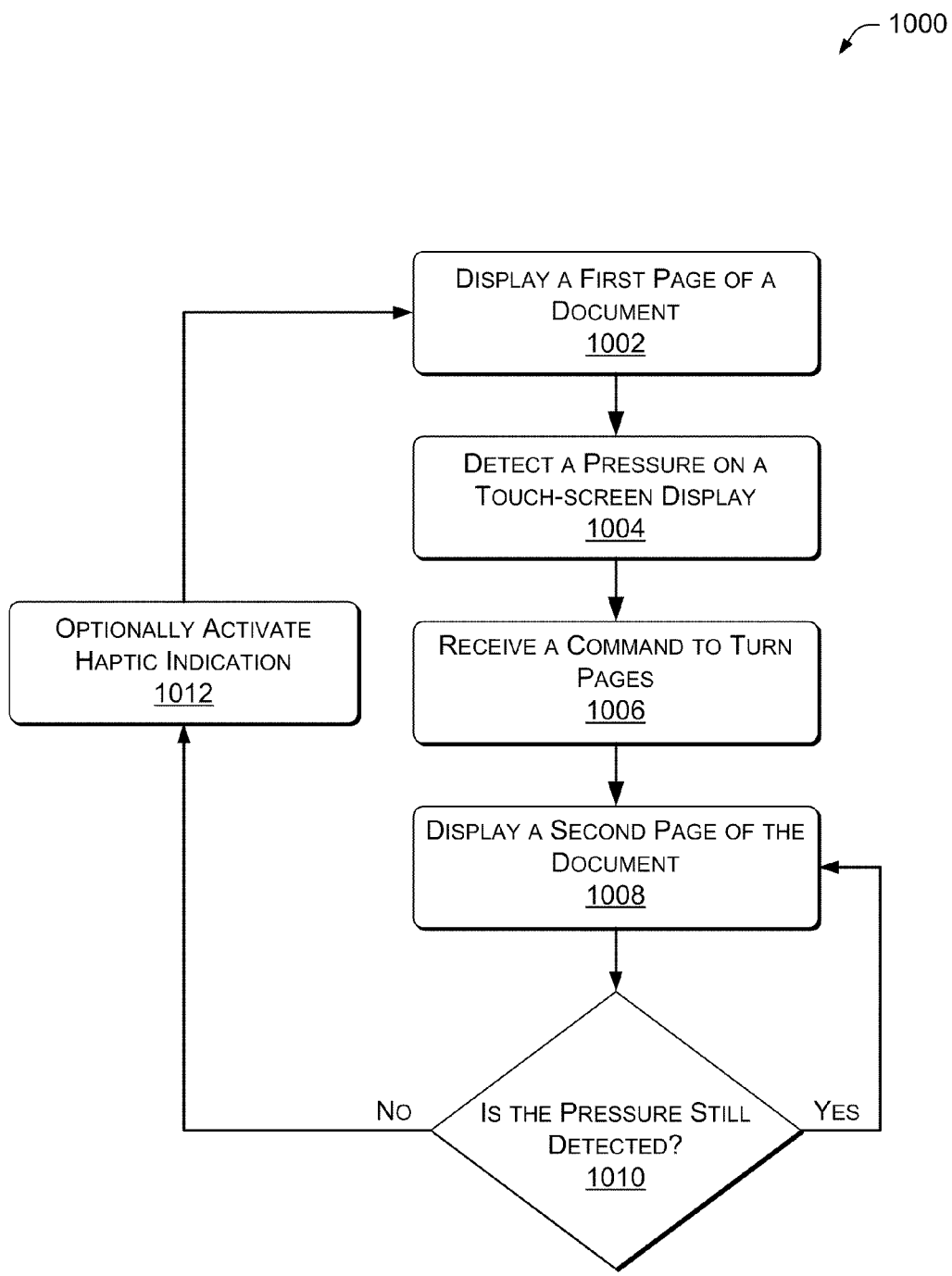
FIG. 10 is a flow diagram illustrating an illustrative process of page turning and returning to a bookmarked page.

FIG. 10 illustrates a process 1000 for bookmarking a page of an electronic document using the touch-screen display 104 of the eBook reader device 102.

At 1002, a first page of an electronic document is displayed on the touch-screen display 104 of the eBook reader device 102. The display may be similar to the UI representation 600 shown in FIG. 6.

At 1004, pressure is detected on the touch-screen display 104. The pressure may be detected in a defined area of the touch-screen 104, as described above in FIG. 7. The pressure may be caused by an object, such as a stylus or a user's finger. The pressure is interpreted by the bookmarking module 114 as a command to bookmark the currently displayed page.

At 1006, a command to turn pages is received. This page-turn command may be received by the page turn detector 112. The command to turn pages may cause one or more pages to be turned forwards or backwards. Page-turn commands are described in more detail above in FIGS. 4-6.

At 1008, a second page of the electric document is displayed on the eBook reader device 102. The second page is displayed in response to the command to turn pages received at 1006. The second page is not necessarily adjacent to the first page in the pagination of the document. For example, if the command to turn pages is a command to turn 10 pages, or alternatively 10 repetitions of a command to turn one page, the second page of the document displayed in process 1000 will be a page that is 10 pages away from the first page of the document displayed at 1002.

At 1010, a determination is made as to whether pressure is still detected on the touch-screen display 104. In one implementation, the continued presence or absence of pressure at the bookmark button 704 is detected. The determination may be performed by the bookmarking module 114. If pressure is still detected (i.e., the "Yes" branch from 1010), the second page of the document remains displayed at 1008. When the pressure of the object is no longer detected (i.e., the "No" branch from 1010), the eBook reader device snaps back to the first page of the electronic document and displays it at 1002. As described above in FIG. 9, redisplaying the first page of the electronic document may optionally be accompanied by a haptic and/or audio indication, such as a vibration, at 1012.

Searching for Books Based on Size or Available Time

An eBook reader device 102 may contain a large number of unabridged eBooks. Organizing and sorting the books becomes increasingly important as the number of books stored thereon increases. Users of the eBook reader device 102 may wish to identify books based on size or a time parameter (such as available time to read, or the amount of time it will take to read the book). With physical books, this may be accomplished by simply looking at a book and evaluating its size. However, with eBooks, it is more difficult for a user to gain a sense of size of the electronic documents.

This section of the disclosure discusses example techniques for searching for documents based on size and/or a time parameter. These searching and filtering parameters may be selected using various gesture inputs via the touch-screen display.

Figure 11:
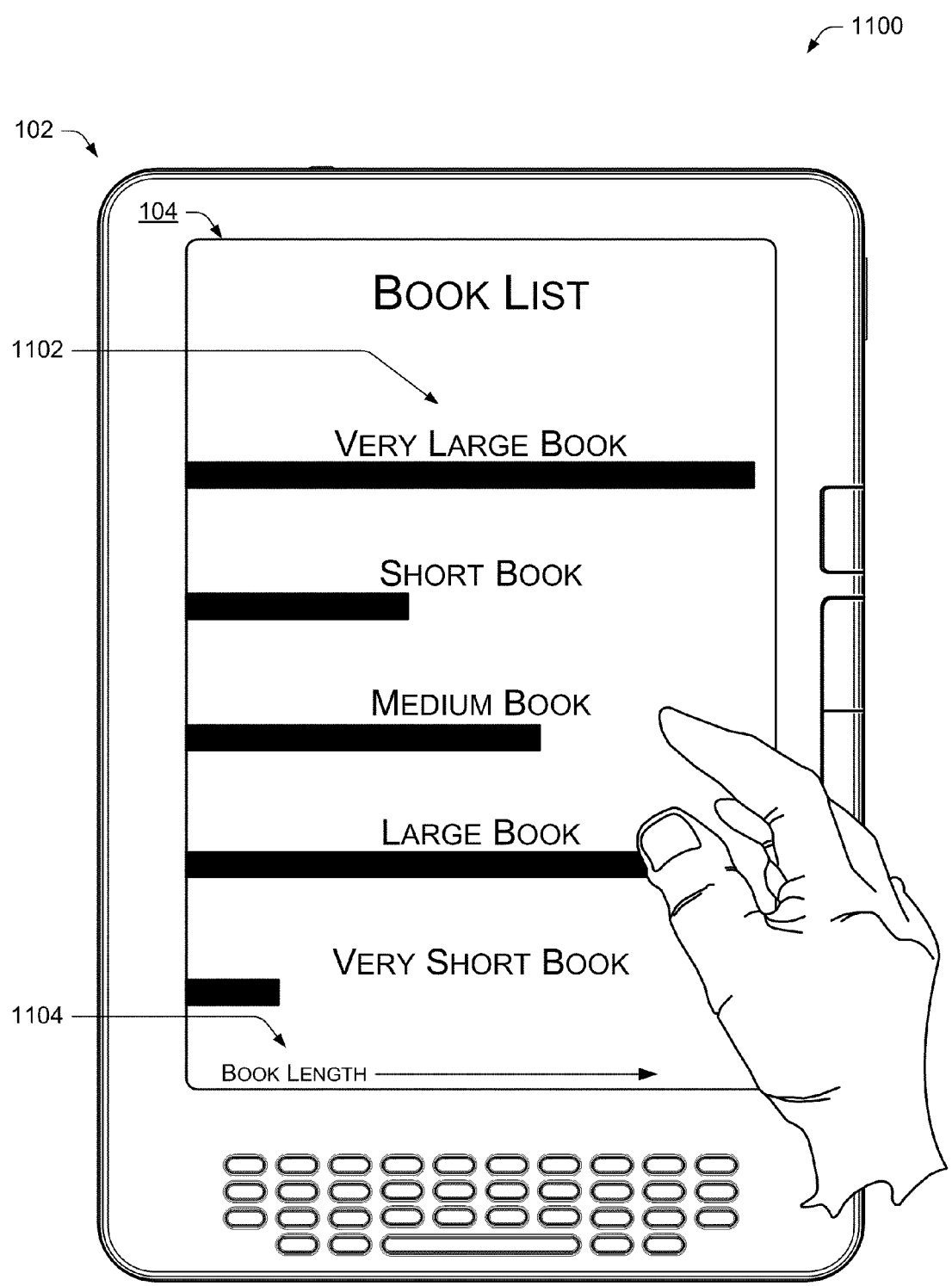
FIG. 11 illustrates a book list displayed on the eBook reader device.

FIG. 11 shows a user interface representation 1100 for displaying a book list 1102 on the eBook reader device 102. While books are shown in this example, it is noted that the book list 1102 may display lists of other types of electronic documents, including a mixture of document types, without departing from the spirit and scope of the description herein. For example, the book list 1102 may contain books, magazines, newspapers, periodicals, journals, reference materials, telephone books, textbooks, anthologies, instruction manuals, proceedings of meetings, forms, directories, maps, web pages etc.

In one implementation, the book list 1102 includes visual indicators of book length 1104 along with titles of the books. The visual indicators of book length 1104 may be bars or columns that represent length of the books in the book list 1102. In some implementations, the visual indicator may indicate an amount of the book that remains unread. The visual indicator is not limited to bars or columns, but may include other representations such as a three-dimensional representation of a book that appears larger or taller in proportion to the size of other books. In this example, the length of a horizontal bar corresponds to the length of a book. The book list 1102 may be ordered according to book length. Alternatively, the book list 1102 is ordered based on other factors, such as closeness of match to a search query, alphabetically, by date, price, or the like. In some situations, the book list 1102 may be ordered according to a filter (e.g., search, user preferences, etc.) and secondarily by book length. In the illustration of FIG. 11, five books are shown, with example titles ordered as follows: "Very Large Book", "Short Book", "Medium Book", "Large Book", and "Very Short Book".

The user may select one of the books in the book list 1102 by placing an object (e.g., finger or stylus) on or near a part of the touch-screen display 104 that is, for example, displaying the title of the book. In response, a subset of the book list 1102 is displayed. Books included in the subset of the book list 1102 are determined by a size of the book indicated by the user. In this example, the user is shown selecting the "Medium Book" with his finger. Size may be determined in various ways, such as by number of pages in the book, number of words in the book, number of characters in the book, or the like.

Figure 12:
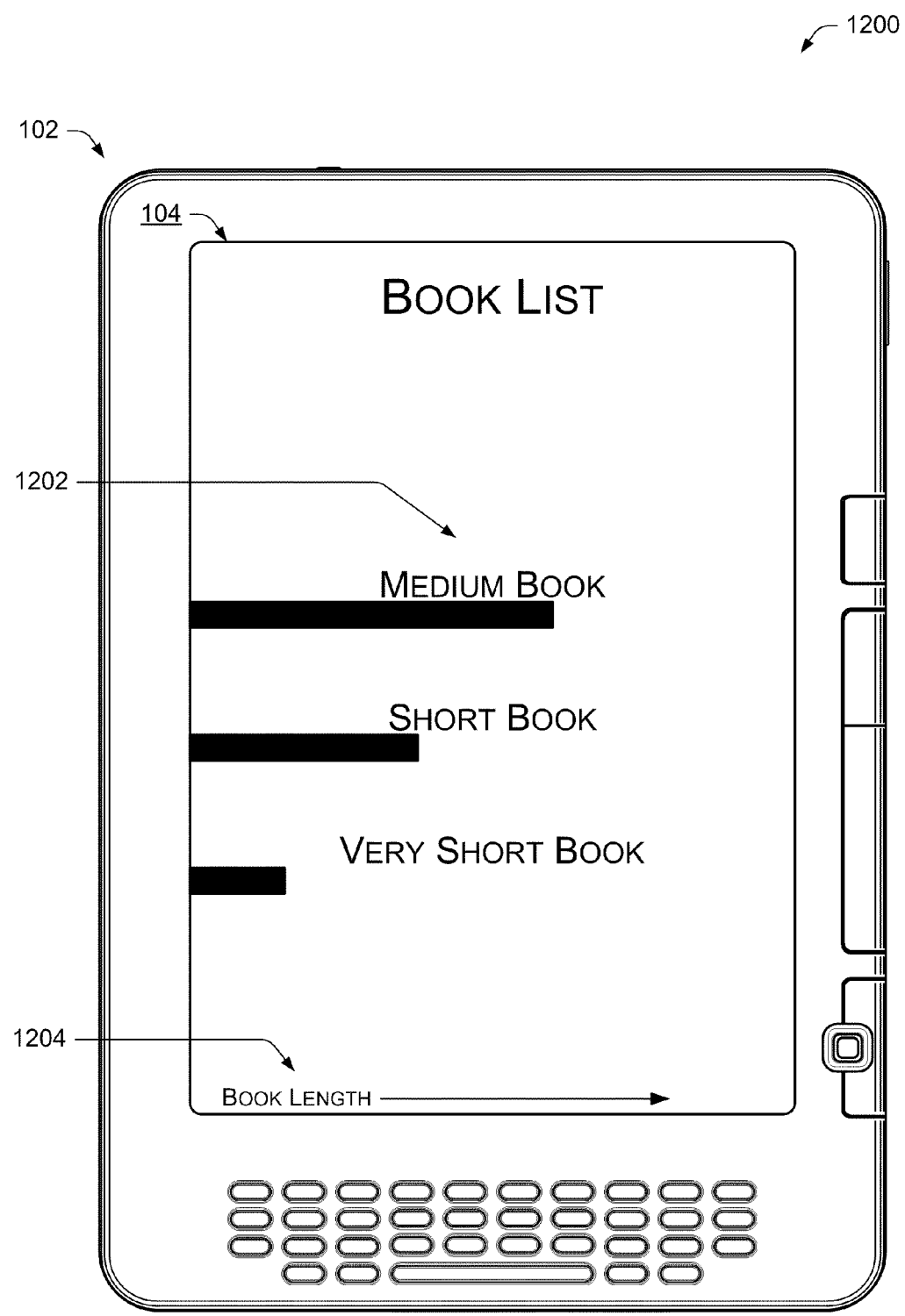
FIG. 12 illustrates the eBook reader device displaying a subset of the book list in FIG. 11.

FIG. 12 shows a user interface representation 1200 that displays a subset 1202 of the book list 1102 shown in FIG. 11 following selection of the "Medium Book". The subset list 1202 may be ordered based on size. In this example, the subset list 1202 is ordered top-to-bottom from larger to smaller. The subset list 1202 may alternatively be ordered top-to-bottom from smaller to larger. In one implementation, the subset list 1202 may also include visual indicators of book length 1204, as described above in FIG. 11.

In this illustration, the subset list 1202 contains eBooks with a size equal to or smaller than the selected "Medium Book". Hence, the books "Short Book" and "Very Short Book" are included in the subset list 1202. In other implementations, eBooks having a size equal to or larger than the size of the selected book, or eBooks are a next size larger or next size smaller, may be included in the subset list 1202. The subset list 1202 may be thought of as the book list 1102 after filtering based on a size of the book indicated by the user.

As another option, the type of filtering applied to the book list 1102 may depend on a type of object and/or a type of gesture that generates the indication on the touch-screen display 104. For example, selecting a book by pressing the title of "Medium Book" in FIG. 11 with two fingers may filter the book list 1102 by removing books larger than the indicated book. In contrast, indicating a book by pressing the title of "Medium Book" in FIG. 11 with only one finger may filter the book list 1102 by removing books smaller than the indicated book. As a further example, indicating a book by pressing the title of the book and then making a swiping gesture upwards may filter the book list 1102 by removing books smaller than the indicated book, while making a swiping gesture downwards may filter the book list 1102 by removing books larger than indicated book.

Figure 13:
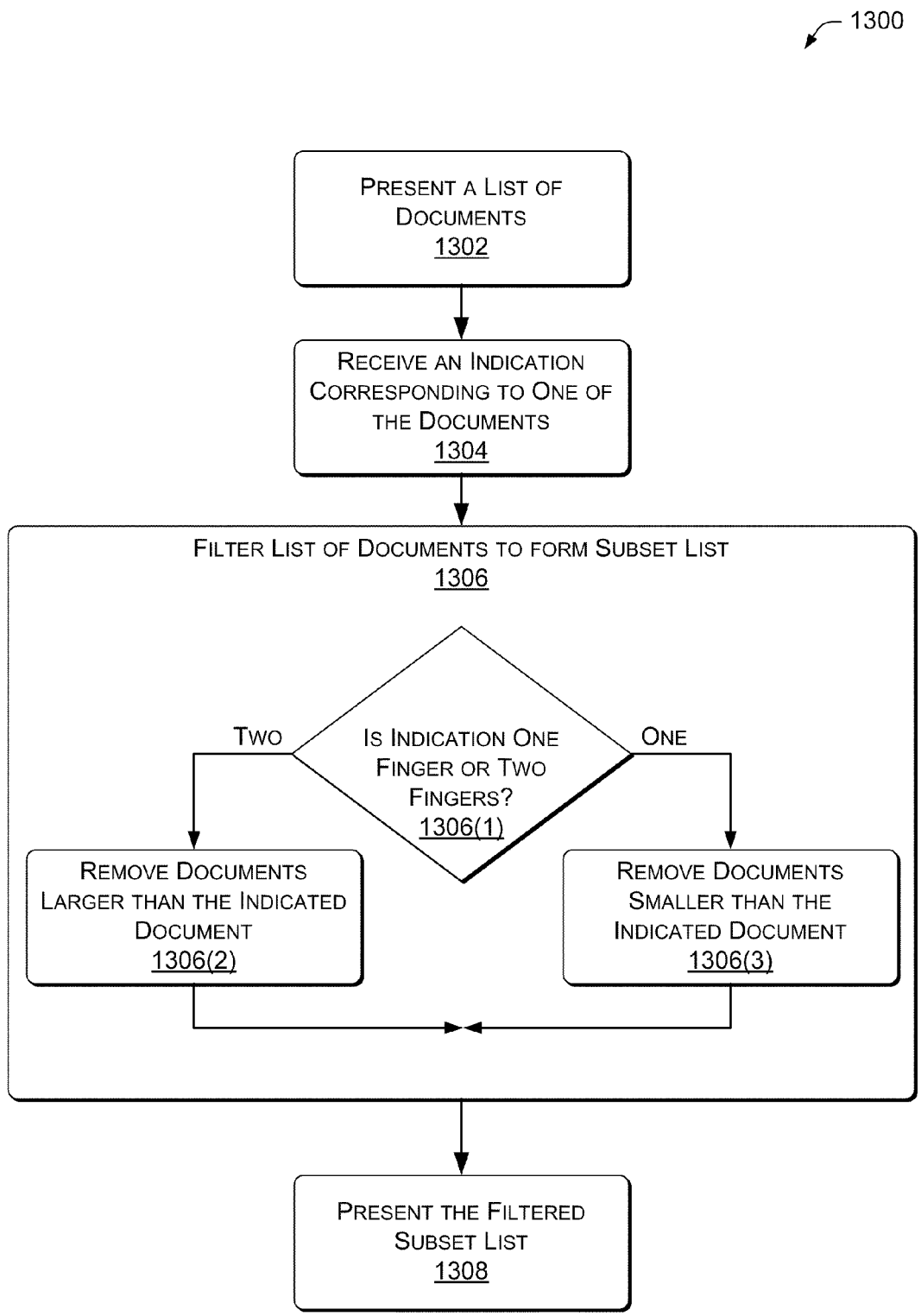
FIG. 13 is a flow diagram illustrating an illustrative process of filtering a book list.

FIG. 13 shows a process 1300 for filtering a list of electronic documents using the touch-screen display 104 of the eBook reader device 102.

At 1302, a list of electronic documents is presented to the user on the touch-screen display 104 of the eBook reader device 102. As described above in FIG. 110, the list of documents may include visual indications of document length. The list may be ordered or unordered.

At 1304, indication corresponding to one of the electronic documents in the list is received. The indication may be generated by an object on or near a portion of the touch-screen display 104 that is displaying a title or other representation of one of the documents in the list. In one implementation, the object is one or more of the user's fingers, but it may also be a stylus or other pointing mechanism.

At 1306, the list is filtered based on the indication made by the user to remove some of the documents and form a subset list. A subset list 1202 is shown in FIG. 12, for example, following selection of a book title "Medium Book" from the list 1102 of FIG. 11. Creation of a subset list per act 1306 may be implemented in different ways. One example implementation is shown in FIG. 13 with sub-acts 1306(1)-(3). At 1306(1), a determination is made whether the user selected the document listed on the touch-screen display 104 using one finger or two fingers. This is detected through multiple pressure points on the screen. If the user employs two fingers (i.e., the "Two" branch from 1306(1)), electronic documents larger than the indicated electronic document are removed at 1306(2). If he uses one finger (i.e., the "One" branch from 1306(1)), electronic documents smaller than the indicated electronic document are removed at 1306(3).

At 1308, the filtered list is presented to the user on the touch-screen display 104. The presentation may be similar to that discussed above in FIG. 12.

The above features allow users to search for books, and filter lists of books, based on size. Another parameter that may be used is time available to read a book or the time it takes to read a book given at the reader's pace.

Figure 14:
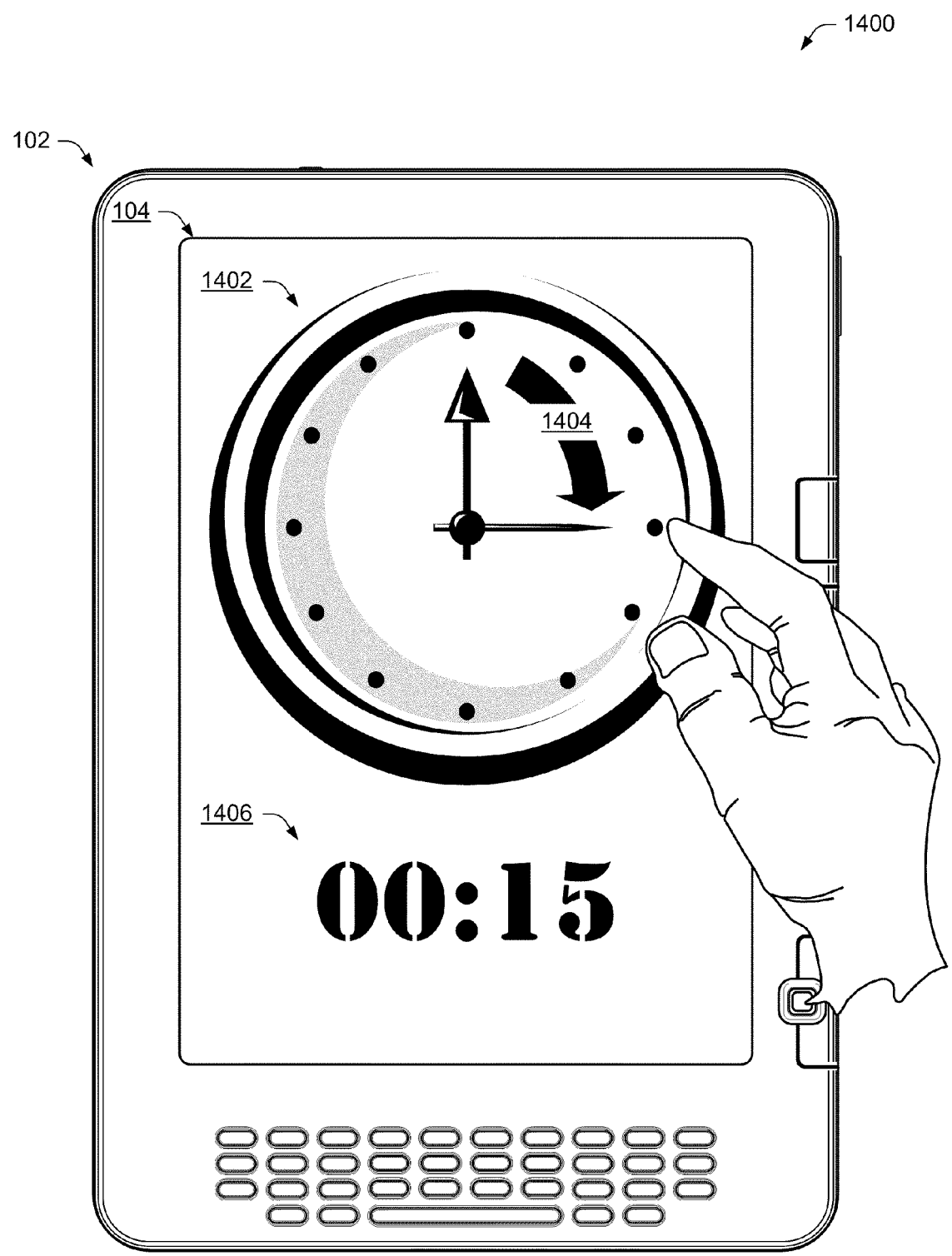
FIG. 14 illustrates a mechanism for selecting an amount of reading time.

FIG. 14 illustrates a user interface representation 1400 of the eBook reader device 102 that allows a user to select a book based on time. This time parameter may represent different conditions, such as an amount of time available to read (e.g., 15 minutes left on a break) or an amount of time it will likely take the user to read the book (e.g., at reader's rate, books or articles that can be completed in 15 minutes). For such time-based filters, the eBook reader device 102 calculates the user's reading speed. A typical reading speed may be calculated based on time between page-turn commands and a number of words or characters displayed on a page. Thus, the time it will take the user to read the book is directly related to size and time-to-read may be thought of as a proxy for size. However, unlike size, the time it will take to read a book may be different for different users. The eBook reader device 102 may maintain multiple user profiles each associated with a respective reading speed.

In FIG. 14, the user interface 1400 depicts a graphical clock 1402 on the touch-screen display 104. The user selects an amount of time by making a gesture with her finger (or stylus) in a clockwise circle 1404 around the face of the clock 1402. The selected amount of time corresponds to a distance the user has moved her finger along the clock face. In this example, the user has moved her finger in a quarter-circle arc, indicating 15 minutes of time. The user interface 1400 may also include a digital clock 1406 to show the selected time. In this example, the digital clock 1406 shows zero hours and 15 minutes. Further, the user may select the time by moving the digits in the digital time representation 1406.

Once a time is entered by the user, the eBook reader device 102 begins to filter documents based on the time parameter. The eBook reader device 102 determines a document size based on the indicated amount of time and the user's reading speed. In this example, documents that the user can read in 15 minutes or less are identified. The eBook reader device 102 then displays a list of documents that qualify given the time constraint.

Figure 15:
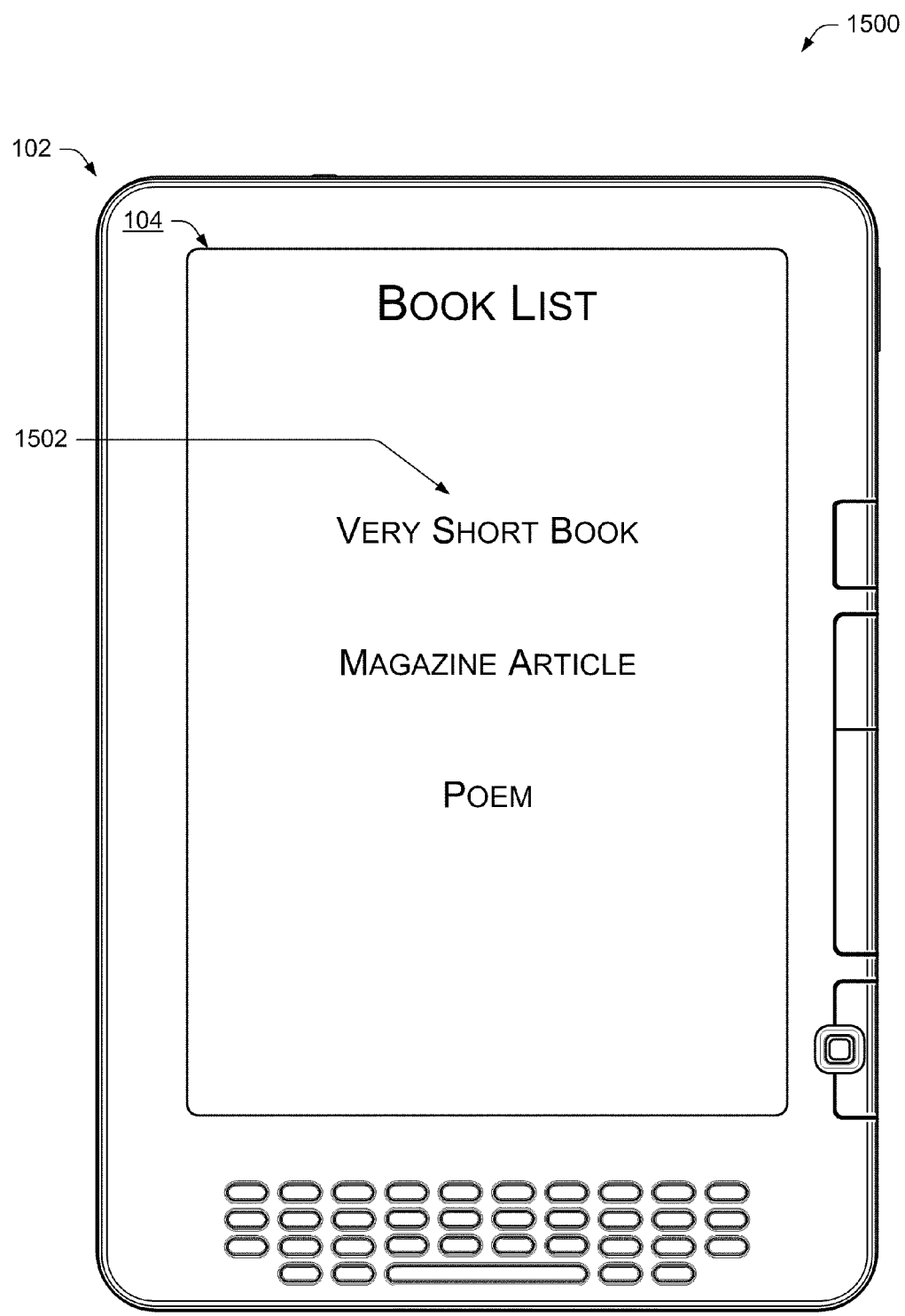
FIG. 15 illustrates a book list based on the selected amount of reading time in FIG. 14.

FIG. 15 illustrates a user interface representation 1500 of the eBook reader device 102 that presents a book list 1502 in response to the amount of time entered by the user. The book list 1502 in this example includes a very short book, a magazine article, and a poem. These are all items that the user should be able to read, based on past reading speed, within the indicated amount of time (e.g., 15 minutes). Of course, in any given instance, the user may read slower than his or her typical reading speed, so in some instances the user may in actuality take longer than the indicated amount of time to read items included in the book list 1502.

Text-to-Speech Conversion

In another usage scenario, a user may wish to convert from text to speech. As described below with respect to FIGS. 16-18, the user may employ various input techniques with the touch-screen user interface to initiate this conversion.

Figure 16:
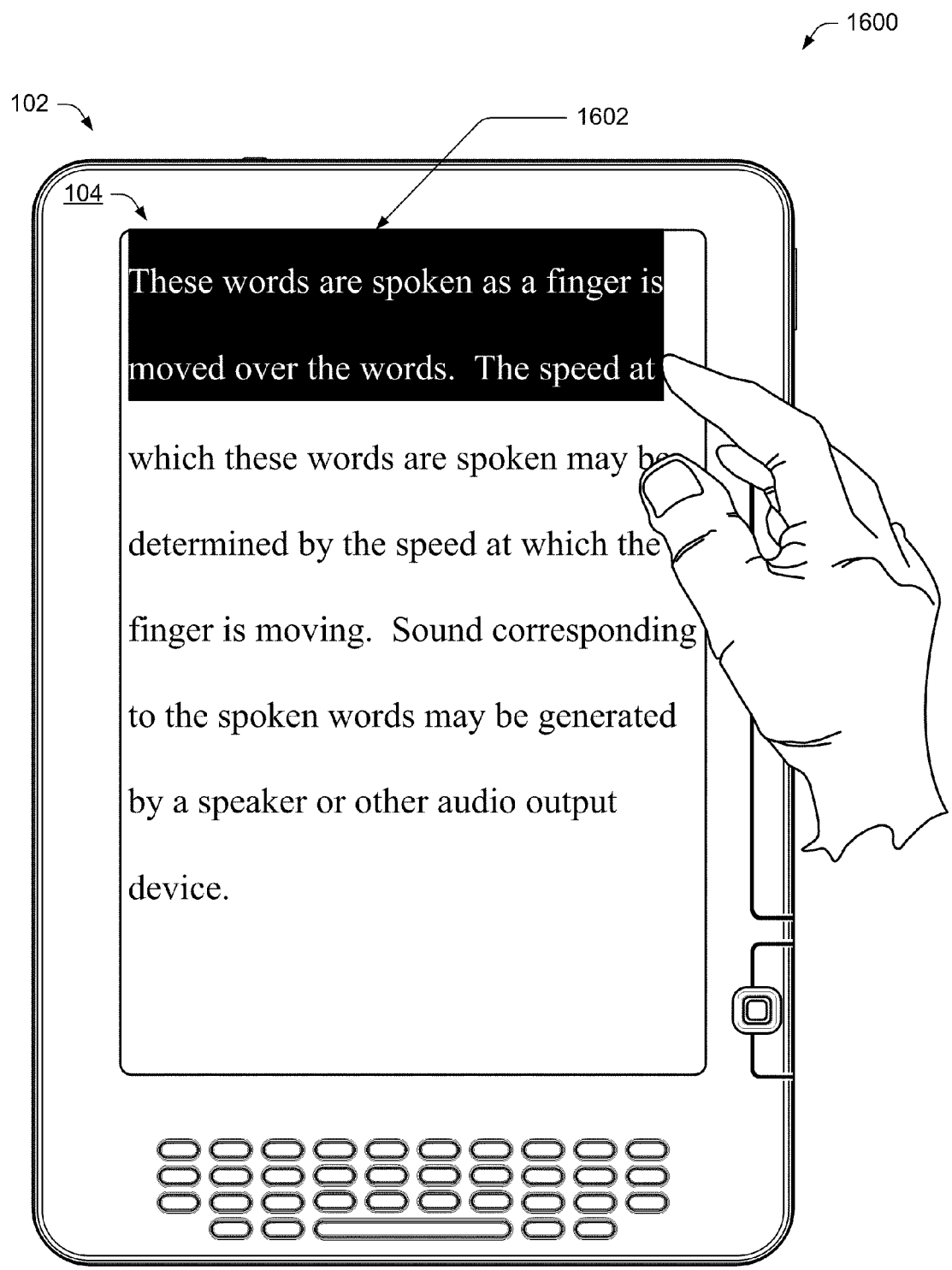
FIG. 16 illustrates a mechanism for the eBook reader device to read text displayed on the touch-screen display.

FIG. 16 illustrates a user interface representation 1600 of the eBook reader device 102 for converting text to speech. Processing of the user input and converting text to speech may be performed in whole or part by the text-to-speech module 118. The eBook reader device 102 displays a visible representation of text on the touch-screen display 104. The user may indicate a portion of the text presented on the touch-screen display 104 by placing an object on or near the portion of the touch-screen display 104 that is displaying the text. Upon receiving the user's text selection, the eBook reader device 102 may generate a spoken representation of the text. In some implementations, the spoken representation of the text is a synthesized human voice reading the text aloud. Sounds corresponding to the spoken representation of the text may be generated by an output device such as a speaker or headphones connected to a headphone jack (or wirelessly via Bluetooth or other technologies).

A speed of the spoken representation of the text corresponds to a speed of the object moving across the touch-screen display 104. The object may be one of the user's fingers, a stylus, or the like. The speed of the spoken representation may increase when the speed of the object increases, or conversely decrease when the speed of the object decreases. In some implementations, the speed of the spoken representation is based on an average speed of the object moving relative to text on the touch-screen display 104 rather than an instantaneous speed of the object. For example, there may be a slight pause when the user moves her finger from the end of one line to the beginning of the next line. To avoid a corresponding pause in the reading of the text, an average speed of the user's finger moving relative to several words in the displayed portion of text may be used to determine the reading speed. For example, the reading speed may be based on the average speed of the object relative to the previous 10 words so that momentary changes in the speed of the object do not affect the reading speed.

In one implementation, a visual representation of the text changes when the text is indicated by placing an object on or near the touch-screen display 104, as represented by highlighting area 1602. The change of the visual representation of the text may include highlighting, changing a color of the text, underlining the text, or the like.

Due to the dual function of the touch-screen display 104 it is possible for the user to indicate a portion of text displayed on the screen by passing an object over words displayed on the touch-screen display 104. Depending on the language and the formatting of the text, there may be horizontal or vertical text. The object, such as the user's finger, is generally moved over the text in the same direction as the text is read. For example, when the text is displayed horizontally on the touch-screen display 104, the object moves in a generally horizontal direction. The direction may be right-to-left or left-to-right depending on the language of the text. When the text is displayed vertically the object moves in a generally vertical direction. Again, the direction may be top-to-bottom or bottom-to-top.

Concepts such as left/right and top/bottom depend on an orientation of the eBook reader device 102 such that if the user rotates the eBook reader device 102, a horizontal motion becomes a vertical motion. In some implementations, the eBook reader device senses when its orientation is changed and automatically adjusts the layout of the text of the display 104.

Figure 17:
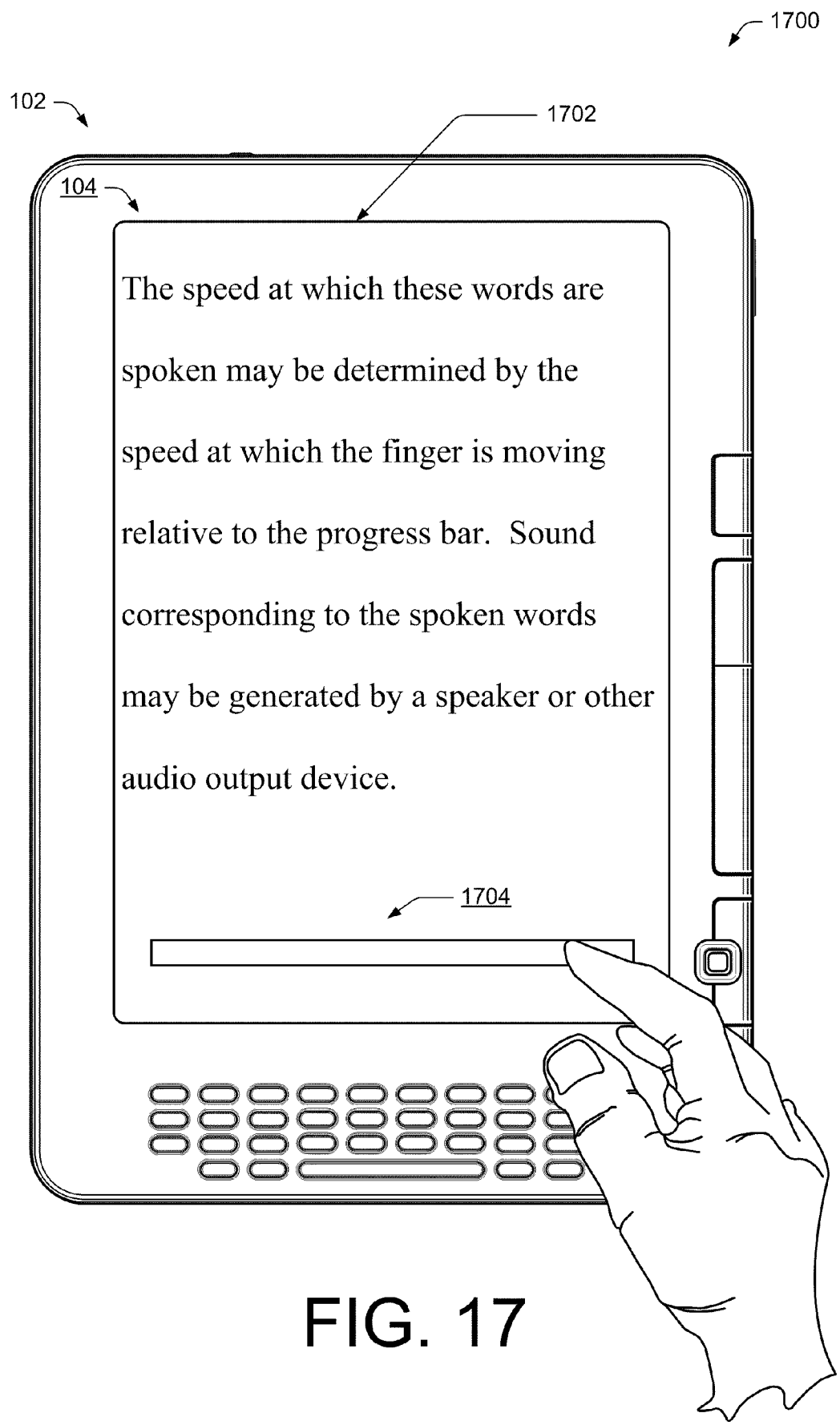
FIG. 17 illustrates a mechanism for the eBook reader device to read text displayed on the touch-screen display.

FIG. 17 illustrates an alternative user interface representation 1700 of the eBook reader device 102 for converting text displayed 1702 on the touch-screen display 104 to speech. In this implementation, the speed of the spoken representation may be based on the speed of the object relative to a progress bar 1704 displayed on the touch-screen display 104. For example, a slider bar or similar display functioning as a progress bar 1704 may be presented alongside the displayed portion of text 1702. By moving the object along the progress bar 1704 the speed of the spoken representation may be controlled. In some implementations of the progress-bar interface, only one motion relative to the progress bar is sufficient to set a reading speed. The eBook reader device 102 may then continue to read the displayed portion of text 1702 without requiring the user to repeatedly move her finger along the progress bar 1704.

Figure 18:
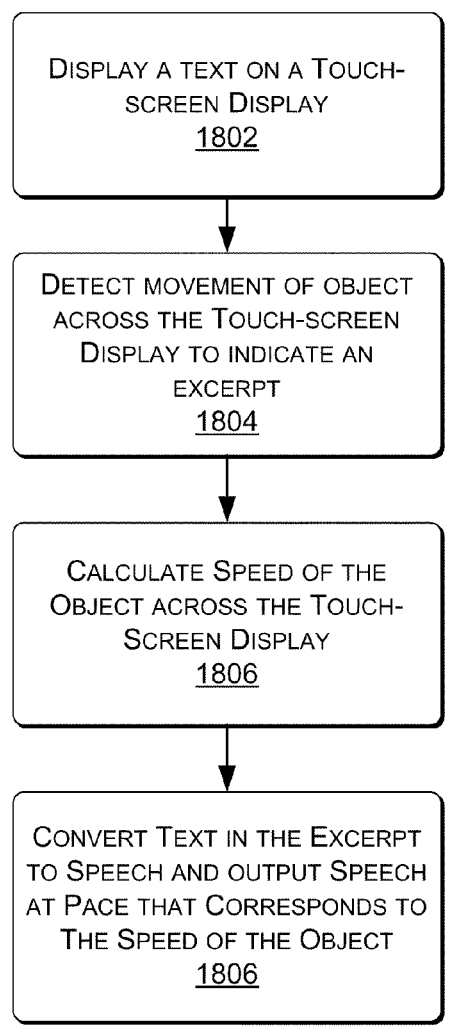
FIG. 18 is a flow diagram illustrating an illustrative process of using a touch-screen display to facilitate conversion of text to speech for excerpts of displayed text.

FIG. 18 shows a process 1800 for using a touch-screen display 104 to facilitate conversion of text to speech for excerpts of displayed text. At 1802, text of an electronic document is displayed on the touch-screen display 104 of the eBook reader device 102.

At 1804, an object is detected at it is moved across the touch-screen display to indicate an excerpt. The object may be the reader's finger, a stylus, or other pointing mechanism. A visual representation of the excerpt may change in response to the reader selection. This is shown, for example, in FIG. 16 where an excerpt 1602 is highlighted in response to the reader's finger being moved across the area.

At 1806, a speed at which the object is moved across the touch-screen display is calculated. Speed may be computed in different ways. One approach is to derive an average speed of the object moving relative to several words (e.g., 10 words) in the excerpt of text.

At 1808, the text in the excerpt is converted to speech. Moreover, the pace of the spoken representation corresponds to the speed of the object calculated at 1806. As the speed of the object increases across the display, the pace of the spoken representation increases. Conversely, as the speed of the object slows down, the pace of the spoken representation slows as well.

Illustrative eBook Reader Device

Figure 19:
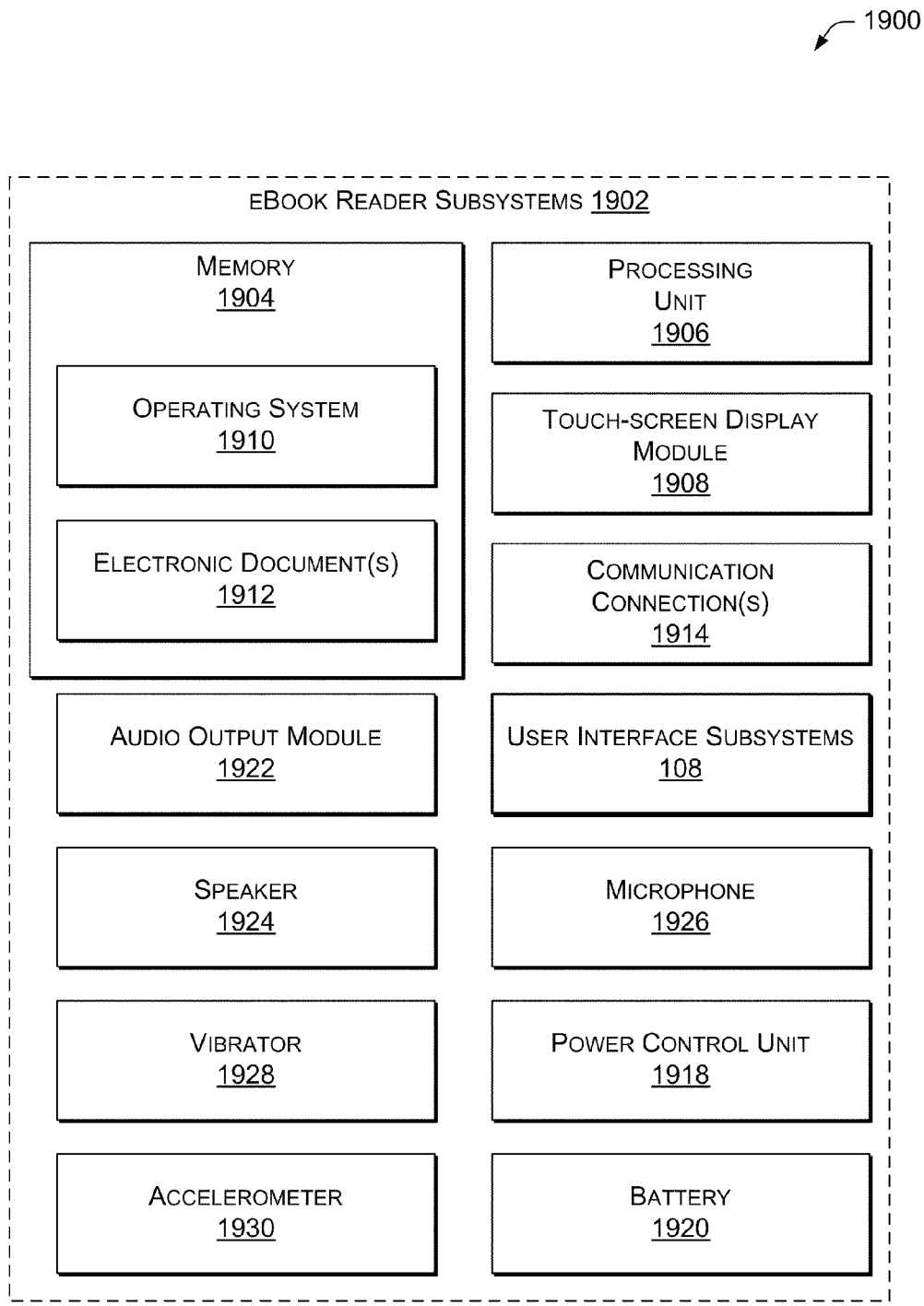
FIG. 19 is a block diagram showing illustrative components that may be implemented in subsystems of the eBook reader device of FIG. 1.

FIG. 19 illustrates selected functional components 1900 that might be implemented as eBook reader subsystems 1902. In a very basic configuration, the subsystems 1902 include a memory 1904, a processing unit 1906, and a touch-screen display module 1908 for controlling eBook content output to the touch-screen display 104 as well as interpreting commands received by the touch-screen display 104. The memory 1904 typically contains an operating system 1910 of the eBook reader device 102. The memory 1904 may also include one or more electronic documents 1912 such as eBooks.

As described above, the touch-screen display 104 is adapted for displaying visible representations of textual or graphic content, such as contents of an electronic book in digital form. For convenience only, the touch-screen display 104 is shown in a generally rectangular configuration in the implementations described herein. However, it is understood that the touch-screen display 104 may be implemented in any shape, and may have any ratio of height to width. Also, for stylistic or design purposes, the touch-screen display 104 may be curved or otherwise non-linearly shaped.

In some implementations, the touch-screen display 104 may be implemented using electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some illustrative electronic paper displays that may be used with the implementations described herein include bi-stable LCDs, MEMS, cholesteric, pigmented electrophoretic, and others. One illustrative electronic paper display that may be used is an E Ink-brand display.

In the same or different implementations, the touch-screen display 104 may be a flexible display. The flexible display may be positioned above a touch sensor(s). The touch sensor(s) may be a resistive touch sensitive film. The flexible display may also include a protective layer made of a flexible material such as plastic. The flexible display may also include a flexible backplane layer. The backplane may also be made of a flexible material, such as plastic, metal, glass or a polymer based material. A flexible backplane may be bendable, rollable, light-weight, etc. In one configuration, the flexible backplane is a matrix backplane on a plastic substrate.

The eBook reader subsystems 108 may also include one or more communication connections 1914 that allow the eBook reader device 102 to communicate with other computer systems or other devices. Electronic books and other content, as well as program modules, may be transferred to the eBook reader device 102 via the communication connection(s) 1914. The communication connection(s) 1914 support both wired and wireless communications with various types of networks, including the Internet. For example, the eBook reader device 102 may be equipped with an RF transceiver to facilitate wireless communication over a wireless network. The device may further include a communication connection that facilitates communication with other devices via, for example, a Bluetooth or IR connection. The communication connection(s) 1912 are one example of communication media. Communication media may typically be embodied by computer readable instructions, data structures, program modules, or other data in a modulated data signal, such as a carrier wave or other transport mechanism, and includes any information delivery media.

One or more user interface subsystems 108 are also provided to capture user input via the touch-screen display 104, the keyboard 106, and any other user input element on the eBook reader device 102. The user interface subsystems 108 are discussed above in more detail in FIG. 1.

The eBook reader subsystems 108 also include a power control unit 1918 and a battery 1920. The power control unit 1918 operatively controls an amount of power, or electrical energy, consumed by the eBook reader device 102. Actively controlling the amount of power consumed by the eBook reader device 102 may achieve more efficient use of electrical energy stored by the battery 1920. The processing unit 1906 supplies computing resources to the power control unit 1918. The power control unit 1918 may further include a clock/timer for accurate control of power consumed by the eBook reader device 102.

The eBook reader device 102 may have additional features or functionality. For example, the eBook reader device 102 may also include an audio output module 1922 for controlling the generation of sounds such as synthesized speech. Output from the audio output module 1922 may be directed to an on-board speaker 1924 or another output device such as a head-phone jack. The eBook reader device 102 may also include microphone(s) 1926 for recording sound such as the user's voice and/or for detecting taps on the display to localize a point of contact on the display as described above in relation to FIG. 3. In some implementations the eBook reader device 102 may also include a vibrator 1928 or other output device for creating a haptic output that is detectable by a user touching the eBook reader device 102. The eBook reader device 102 may include, in some implementations, an accelerometer 1930 for detecting the orientation of the device. Other output device(s) such as an auxiliary display, printer, etc. may also be included.

The memory 1904 is an illustrative example of computer-readable storage media. Thus, computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the eBook reader device 102. Any such computer-readable storage media may be part of the eBook reader device 102.

Various instructions, methods, and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   displaying text of an electronic document on a touch-screen display;
   detecting an object as the object moves across the touch-screen display, the object indicating an excerpt of the text being displayed; and
   generating a spoken representation of the excerpted text, wherein a speed of the spoken representation corresponds to an average speed of the object moving across the touch-screen display such that the speed of the spoken representation increases or decreases in proportion to an increase or decrease of the speed of the object moving across the touch-screen display.

2. The computer-implemented method of claim 1, wherein the object comprises at least one of a stylus or a finger.

3. The computer-implemented method of claim 1, wherein the electronic document is an electronic book, and the touch-screen display is embodied as part of a dedicated electronic book reader device.

4. An electronic device comprising:
   a processor;
   a memory accessible by the processor;
   a touch-screen display to present a visible representation of an electronic document;
   an audio output device;
   one or more programs stored in the memory and configured to be executed by the processor, the one or more programs including instructions for:

receiving an indication of a text from the electronic document presented on the touch-screen display, the indication generated by movement of an object relative to the touch-screen display; and generating a spoken representation of the text, wherein a speed of the spoken representation corresponds to an average speed of the object moving relative to a plurality of words or a plurality of characters presented on the touch-screen display.

5. The electronic device of claim 4, wherein the object comprises at least one of a stylus or a finger.

6. The electronic device of claim 4, wherein the speed of the spoken representation increases when the speed of the object increases.

7. The electronic device of claim 4, wherein the speed of the spoken representation decreases when the speed of the object decreases.

8. The electronic device of claim 4, wherein the speed of the object is a speed of the object moving relative to a progress bar presented on the touch-screen display.

9. The electronic device of claim 4, wherein a visual representation of the text changes when the indication of the text is received.

10. The electronic device of claim 4, wherein the audio output device comprises one of a speaker or a headphone jack.

11. The electronic device of claim 4, wherein the touch-screen display has a pressure detector to sense pressure applied to the touch-screen display, the electronic device further comprising a page turn detector to turn one or more pages in the electronic document in response to sensing of pressure on the touch-screen display.

12. The electronic device of claim 4, further comprising a bookmarking module stored in the memory and executable by the processor to bookmark a first page of the electronic document temporarily in response to continuous pressure being applied to the touch-screen display, while allowing one or more pages to be turned to display a second page, the bookmarking module causing a return to display of the first page upon removal of the pressure.

13. The electronic device of claim 4, wherein the electronic device comprises a dedicated handheld electronic book reader.

14. A non-transitory computer-readable storage medium having stored therein instructions, which when executed by an electronic device, cause the electronic device to perform acts comprising:

receiving a selection of an excerpt of text displayed on a touch-screen display by moving an object over words in the excerpt; and generating a sound corresponding to a voice reading the excerpt of text, wherein a reading speed of the voice reading is based on a speed of the object moving relative to the words in the excerpt of text and the speed of the object moving relative to the words in the excerpt of text is derived as an average speed of the object moving relative to a plurality of words in the excerpt of text.

15. The non-transitory computer-readable storage medium of claim 14, wherein the object moves in a generally horizontal direction when the text is displayed horizontally on the touch-screen display.

16. The non-transitory computer-readable storage medium of claim 14, wherein the object moves in a generally vertical direction when the text is displayed vertically on the touch-screen display.

17. The non-transitory computer-readable storage medium of claim 14, wherein the object comprises at least one of a finger or a stylus.

18. The non-transitory computer-readable storage medium of claim 14, wherein the reading speed increases when the speed of the object moving relative to the words in the excerpt of text increases.

19. The non-transitory computer-readable storage medium of claim 14, wherein the reading speed decreases when the speed of the object moving relative to the words in the excerpt of text decreases.

20. The non-transitory computer-readable storage medium of claim 14, wherein the excerpt is highlighted during user selection.

21. The non-transitory computer-readable storage medium of claim 14, wherein the instructions cause the computing device to perform acts further comprising:

sensing, by a pressure detector, pressure applied to the touch-screen display, and turning one or more pages in the electronic document in response to the sensing of pressure on the touch-screen display; and bookmarking a first page of the electronic document temporarily in response to continuous pressure being applied to the touch-screen display, while allowing one or more pages to be turned to display a second page, and responsive to removal of the pressure redisplaying the first page.

22. The electronic device of claim 4, wherein the average speed of the object is an average speed relative to a predefined previous number words prior to a word indicated by the indication of the text such that the speed of the spoken representation remains constant even when there are momentary changes in the speed of the object.

* * * * *